United States Patent
Yoon et al.

(10) Patent No.: US 9,223,668 B2
(45) Date of Patent: Dec. 29, 2015

(54) METHOD AND APPARATUS TO TRIGGER AND TRACE ON-CHIP SYSTEM FABRIC TRANSACTIONS WITHIN THE PRIMARY SCALABLE FABRIC

(71) Applicant: INTEL CORPORATION, Santa Clara, CA (US)

(72) Inventors: Ki Yoon, Sacramento, CA (US); Robert De Gruijl, San Francisco, CA (US); Chai Ziv, Jerusalem (IL); Michael Klinglesmith, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 40 days.

(21) Appl. No.: 13/800,185

(22) Filed: Mar. 13, 2013

(65) Prior Publication Data

US 2014/0281724 A1    Sep. 18, 2014

(51) Int. Cl.
*G06F 11/00* (2006.01)
*G06F 11/26* (2006.01)
*G06F 11/273* (2006.01)
*G06F 11/36* (2006.01)

(52) U.S. Cl.
CPC ............ *G06F 11/26* (2013.01); *G06F 11/2733* (2013.01); *G06F 11/3636* (2013.01); *G06F 11/3648* (2013.01)

(58) Field of Classification Search
CPC . G06F 11/26; G06F 11/3648; G06F 11/3636; G06F 11/362; G06F 11/2236; G06F 11/3664; G06F 11/0778; G06F 11/3466
USPC ...................................... 714/34, 37
See application file for complete search history.

(56) References Cited

U.S. PATENT DOCUMENTS

| | | | |
|---|---|---|---|
| 6,314,530 B1* | 11/2001 | Mann | 714/38.11 |
| 7,260,745 B1 | 8/2007 | Edwards et al. | |
| 2003/0154430 A1* | 8/2003 | Allen et al. | 714/45 |
| 2012/0226837 A1 | 9/2012 | Cruickshank et al. | |
| 2013/0013969 A1 | 1/2013 | Rajarao et al. | |

FOREIGN PATENT DOCUMENTS

WO    2013032715    3/2013

OTHER PUBLICATIONS

Extended European Search Report for European Application No. 14158763.3, mailed on Apr. 20, 2015, 8 pages.

* cited by examiner

*Primary Examiner* — Yair Leibovich
(74) *Attorney, Agent, or Firm* — Carrie A. Boone, P.C.

(57) ABSTRACT

A fabric trace hook is disclosed to enable debugging operations of agents operating in a peer-to-peer integrated on-chip system fabric. The fabric trace hook, embedded within the IOSF, includes programmable triggering and capturing logic, timestamp capability, and a security feature to disallow tracing of proprietary transactions. The fabric trace hook may operate in a lossy or lossless mode.

29 Claims, 17 Drawing Sheets

METHOD AND APPARATUS TO TRIGGER AND TRACE ON-CHIP SYSTEM FABRIC TRANSACTIONS WITHIN THE PRIMARY SCALABLE FABRIC

TECHNICAL FIELD

This application relates to debug capability on system-on-chip devices and, more particularly, to performing debugging operations of peer-to-peer transactions within the fabric of the system.

BACKGROUND

A system-on-chip (SoC) is an integrated circuit that combines different components, such as those traditionally associated with a processor-based system, into a single chip or, in some applications, within a small number of interconnected chips. The SoC may include advanced processors, various homogeneous and/or heterogeneous processing agents, and additional components such as networking devices, e.g., routers, controllers, bridge devices, memories, and so forth.

One implementation of a SoC may include an integrated on-chip system fabric (IOSF) specification issued by a semiconductor manufacturer to provide a standardized on-die interconnect protocol for attaching intellectual property (IP) blocks of varying types within the SoC. The IP blocks may include general-purpose processors, such as in-order or out-of-order cores, fixed function units, graphics processors, and controllers.

By standardizing an interconnect protocol such as IOSF, a framework is thus realized for a broad use of IP agents in different types of chips. The standardized interconnect protocol enables the semiconductor manufacturer to efficiently design different types of chips across a wide variety of customer segments. Further, the standardized protocol specification enables third parties to design logic, such as IP agents, to be incorporated into such chips. By providing multiple options for many facets of the interconnect protocol, reuse of designs is efficiently accommodated.

Primary scalable fabric (PSF) is a highly configurable SoC backbone IP based on the IOSF standard. PSFs are used to create an IOSF-compliant hierarchy that provides interconnection of IP blocks within the SoC or within an I/O subsystem. A single SoC may have one or more PSFs, at least one of which is coupled to the central processing unit (CPU) through a system agent (SA).

Under PSF 1.0, all transactions pass through the SA to the CPU. Debugging operations are thus performed at the SA, and all agents of the SoC are potential targets for the debug.

By contrast, PSF 2.0 supports peer-to-peer transactions between agents, which essentially removes the SA from the transaction path. This complicates the ability of a debugger to reach all entities on the SoC. (The IOSF specification, as well as PSF 1.0 and 2.0, are developed by Intel Corporation of Santa Clara, Calif.)

Thus, there is a need for a debug solution for an integrated on-chip system fabric supporting peer-to-peer transactions.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

DETAILED DESCRIPTION

In accordance with the embodiments described herein, a fabric trace hook is disclosed to enable debugging operations of agents operating in a peer-to-peer integrated on-chip system fabric (IOSF). The fabric trace hook, embedded within the IOSF, includes programmable triggering and capturing logic, timestamp capability, and a security feature to disallow tracing of proprietary transactions. The fabric trace hook may operate in a lossy or lossless mode.

In the following detailed description, reference is made to the accompanying drawings, which show by way of illustration specific embodiments in which the subject matter described herein may be practiced. However, it is to be understood that other embodiments will become apparent to those of ordinary skill in the art upon reading this disclosure. The following detailed description is, therefore, not to be construed in a limiting sense, as the scope of the subject matter is defined by the claims.

Before describing the fabric trace hook in detail, some background discussion of the environment in which the fabric trace hook operates is appropriate.

Figure 1:
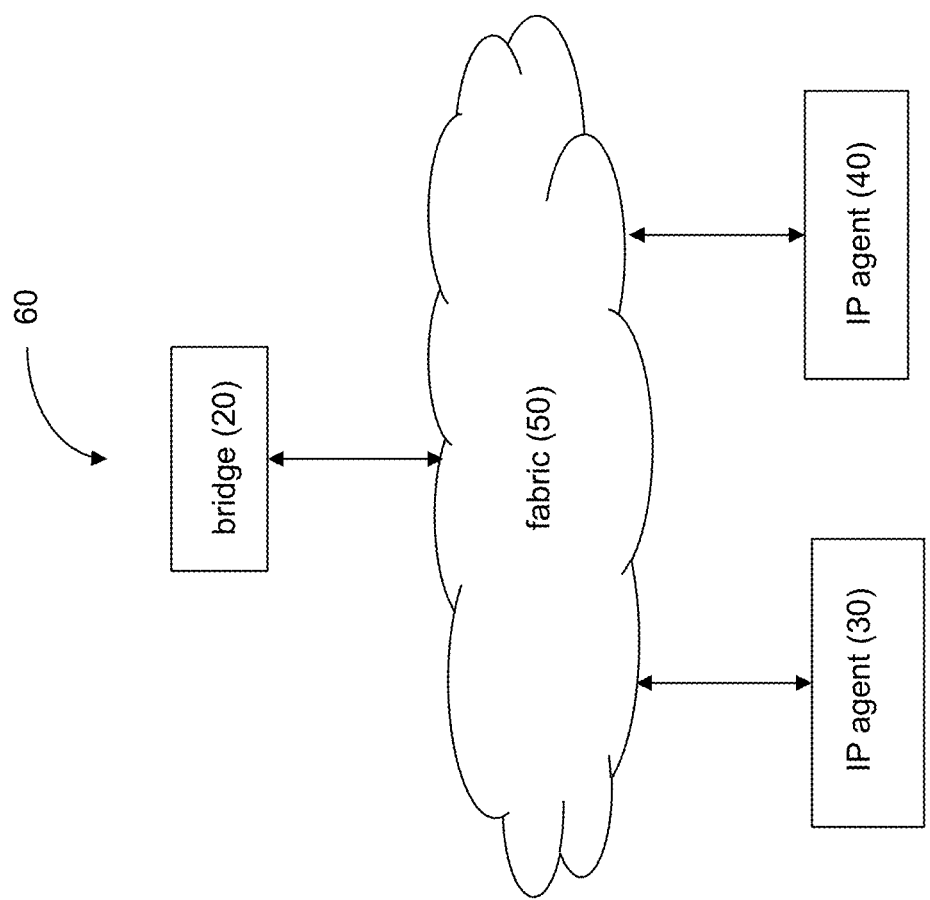
FIG. 1 is a simplified block diagram of a basic interconnect architecture, according to some embodiments.

FIG. 1 is a simplified block diagram of a basic interconnect architecture 60, according to some embodiments. The interconnect architecture 60 may be a portion of a system-on-chip (SoC) or other semiconductor device and includes a fabric 50 that acts as an interconnect between various components. Intellectual property (IP) agents 30 and 40 are independent IP blocks to provide various functionalities, such as computation, graphics, and so forth. These IP agents are thus IP blocks or logical devices having an interface that is compliant with the IOSF specification, in some embodiments.

The fabric 50 interfaces to a bridge 20. The bridge 20 may act as an interface to other system components, whether the components reside on the same chip or are part of other chips that couple to the interconnect architecture 60.

Each component of the interconnect architecture 60, namely, the fabric 50, the IP agents 30 and 40, and the bridge 20, may include one or more interfaces to handle communication of various signals. The IOSF specification defines signals for communication on these interfaces, protocols used for information exchange between agents, arbitration and flow control mechanisms used to initiate and manage information exchange, supported address decoding and translation capabilities, messaging for in-band or out-of-band communication, power management, test, and validation and debug support. In some embodiments, these interfaces are defined according to the IOSF specification.

The IOSF specification includes three independent interfaces that can be provided for each agent, namely a primary interface, a sideband message interface, and a testability or design for test (DFx) interface. According to the IOSF specification, an agent may support any combination of these interfaces. Specifically, an agent can support zero or more primary interfaces, zero or more sideband message interfaces, and an optional DFx interface. However, according to the IOSF specification, an agent must support at least one of these three interfaces.

The fabric 50 may be a hardware element that moves data between different agents. In some embodiments, the topology of the fabric 50 is product-specific. As examples, a fabric may be implemented as a bus, a hierarchical bus, or a cascaded hub.

Figure 2:
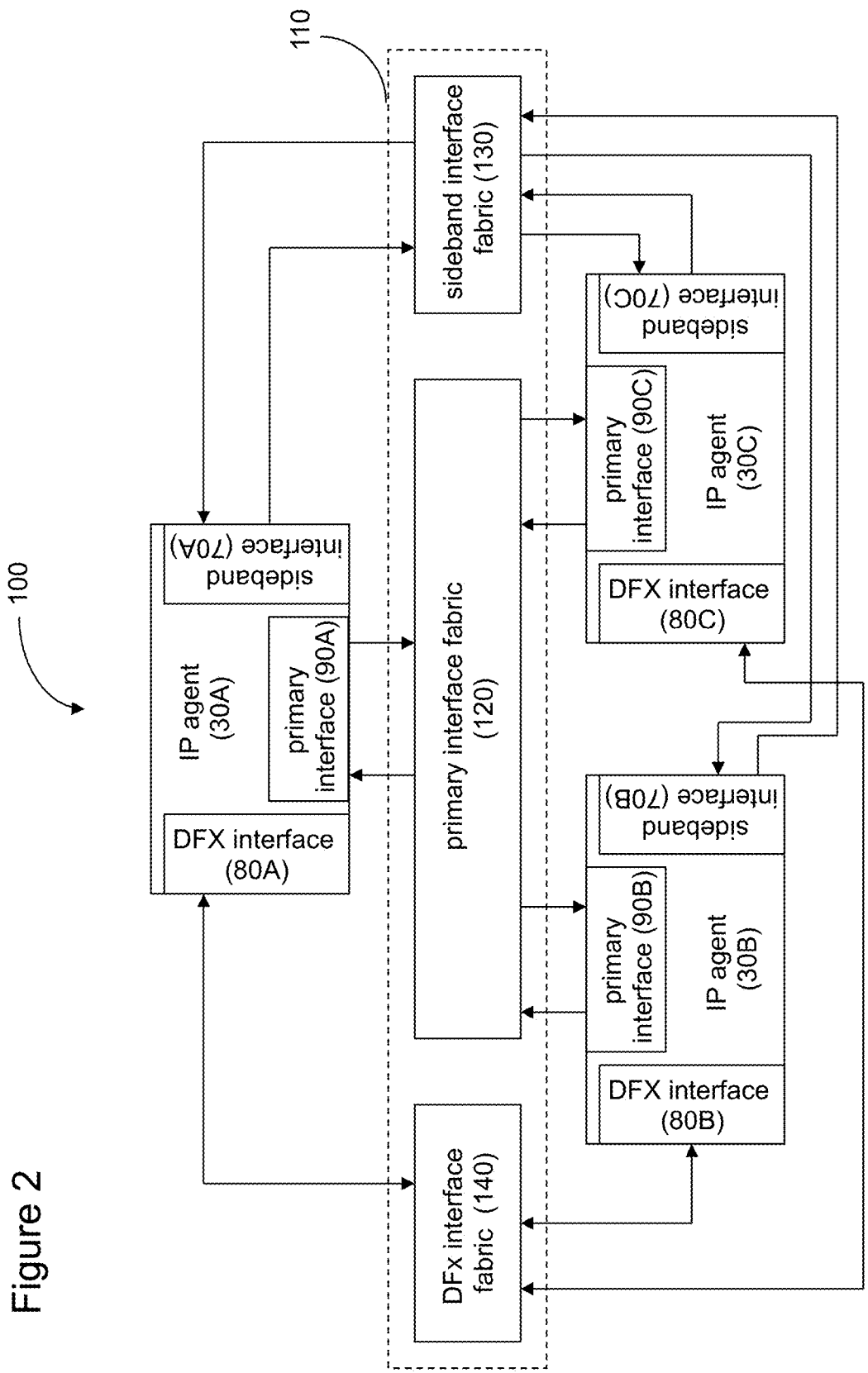
FIG. 2 is a more detailed block of an interconnect architecture, according to some embodiments.

FIG. 2 is a more detailed block diagram of an interconnect architecture 100, according to some embodiments. A fabric 110 includes a primary interface 120, a sideband interface 130, and a DFx interface 140. The primary interface 120 may be used for in-band communication, e.g., between a host processor such as a central processing unit (CPU) or other processor, and an agent. Primary interface 120 may further enable communication of peer transactions between agents and supported fabrics. All transaction types, including memory, input output (I/O), configuration, and in-band messaging, may be delivered via the primary interface 120. The primary interface 120 may operate as a high-performance interface for data transferred between peers and/or communications with upstream components.

In some embodiments, the primary interface 120 implements a split transaction protocol to achieve maximum concurrency. That is, the protocol provides for a request phase, a grant phase, and a command and data phase. Primary interface 120 supports three basic request types: posted, non-posted, and completions, in various embodiments. Generally, a posted transaction is a transaction which, when sent by a source, is considered complete by the source and the source does not receive a completion or other confirmation message regarding the transaction. One such example of a posted transaction may be a write transaction.

In contrast, a non-posted transaction is not considered completed by the source until a return message is received by the source, namely, a completion. One example of a non-posted transaction is a read transaction in which the source agent requests a read of data. The read transaction is not considered complete by the agent until the completion message provides the requested data to the agent.

In addition, the primary interface 120 supports the concept of distinct channels to provide a mechanism for independent data flows throughout the system. The primary interface 120 may include a master interface, to initiate transactions, and a target interface, to receive transactions (not shown). The primary master interface may further be sub-divided into a request interface, a command interface, and a data interface, with the request interface providing control for movement of a transaction's command and data. In some embodiments, the primary interface 120 supports PCI ordering rules and enumeration.

In turn, sideband interface 130 may be a standard mechanism for communicating out-of-band information, such as status, interrupt, power management, configuration shadowing, and test modes. In this way, special-purpose wires designed for a given implementation are avoided, enhancing the ability of IP reuse across a wide variety of chips. In contrast to an IP block that uses dedicated wires to handle out-of-band communications, the sideband interface 130 under the IOSF specification standardizes all out-of-band communication, promoting modularity and reducing validation requirements for IP reuse across different designs. In some embodiments, the sideband interface 130 communicates low-performance information rather than primary data transfers, which typically are communicated via primary interface 120.

As further illustrated in FIG. 2, IP agents 30A, 30B, and 30C include corresponding primary interfaces 90A, 90B, and 90C, sideband interfaces 70A, 70B, and 70C, and DFx interfaces 80A, 80B, and 80C, respectively. As discussed above, each agent need not include every one of these interfaces, as a given IP agent may include but a single interface, in some embodiments.

Figure 3:
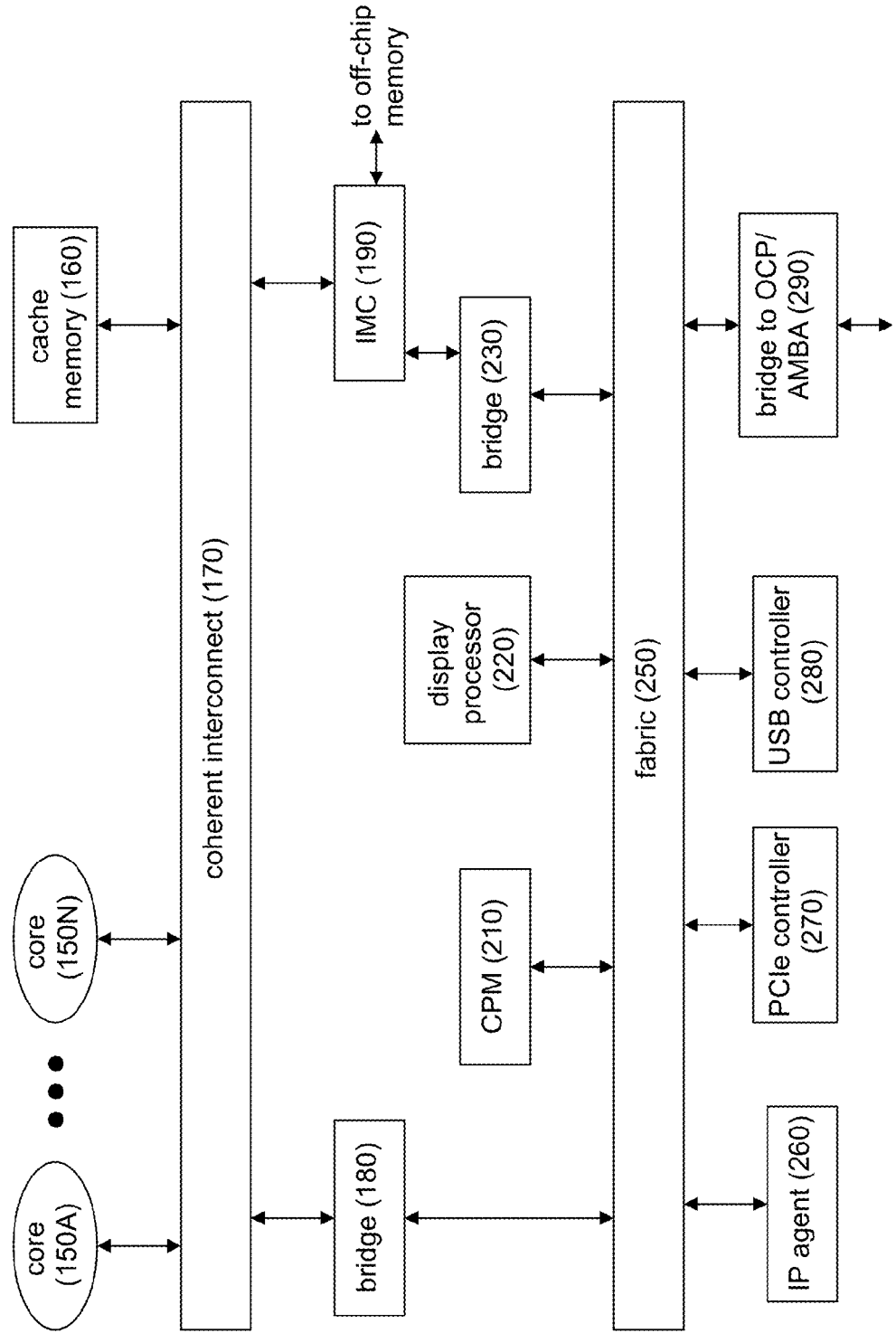
FIG. 3 is a block diagram of a system-on-chip configuration, according to some embodiments.

Using an IOSF specification, various types of chips can be designed having a wide variety of different functionality. Referring now to FIG. 3, shown is a high-level block diagram of a SoC, according to some embodiments. The SoC 200 includes various components, all of which can be integrated on a single semiconductor die to provide for various processing capabilities at high speeds and low power, consuming a comparatively small amount of real estate.

The SoC 200 includes a plurality of cores 150A-150N (collectively, "cores 150"). In various embodiments, the cores 150 can be relatively simple in-order cores or more complex out-of-order cores. Or a combination of in-order and out-of-order cores can be present in a single SoC. As seen, cores 150 can be interconnected via a coherent interconnect 170, which further couples to a cache memory 160, such as, for example, a shared last level cache (LLC). Although the scope of the present disclosure is not limited in this regard, in one embodiment, coherent interconnect 170 is designed in accordance with the Quick Path Interconnect (QPI)™ specification. (The QPI™ is a product of Intel Corporation of Santa Clara, Calif.).

As further seen in FIG. 3, coherent interconnect 170 may communicate via a bridge 180 to a fabric 250, which may be an IOSF fabric. Coherent interconnect 170 may further communicate via an integrated memory controller (IMC) 190 to an off-chip memory (not shown), and further through a bridge 230 to the fabric 250.

As further seen in FIG. 3, various components can couple to the fabric 250, including a content processing module (CPM) 210, which can be used for performing various operations such as security processing, cryptographic functions, and so forth. In addition, a display processor 220 can be part of a media processing pipeline that renders video for an associated display (not shown).

The fabric 250 may further couple to an IP agent 260. Although only a single agent is shown for ease of illustration in the embodiment of FIG. 3, understand that multiple such agents are possible in different embodiments. In addition, to enable communication with other on-chip devices, the fabric 250 may further communicate with a PCIe™ controller 270 and a universal serial bus (USB) controller 280, both of which can communicate with various devices according to these protocols.

Finally, the SoC 200 of FIG. 3 features a bridge 290, which can be used to communicate with additional components of other protocols, such as an open core protocol (OCP) or an ARM advanced microcontroller bus architecture (AMBA) protocol.

While shown as a single die SoC implementation in FIG. 3, embodiments can further be implemented in a system in which multiple chips communicate with each other via a non-IOSF interface. Further, the scope of the present disclosure is not limited to the particular component illustration of FIG. 3, as additional or different components may be present in different embodiments.

Figure 4:
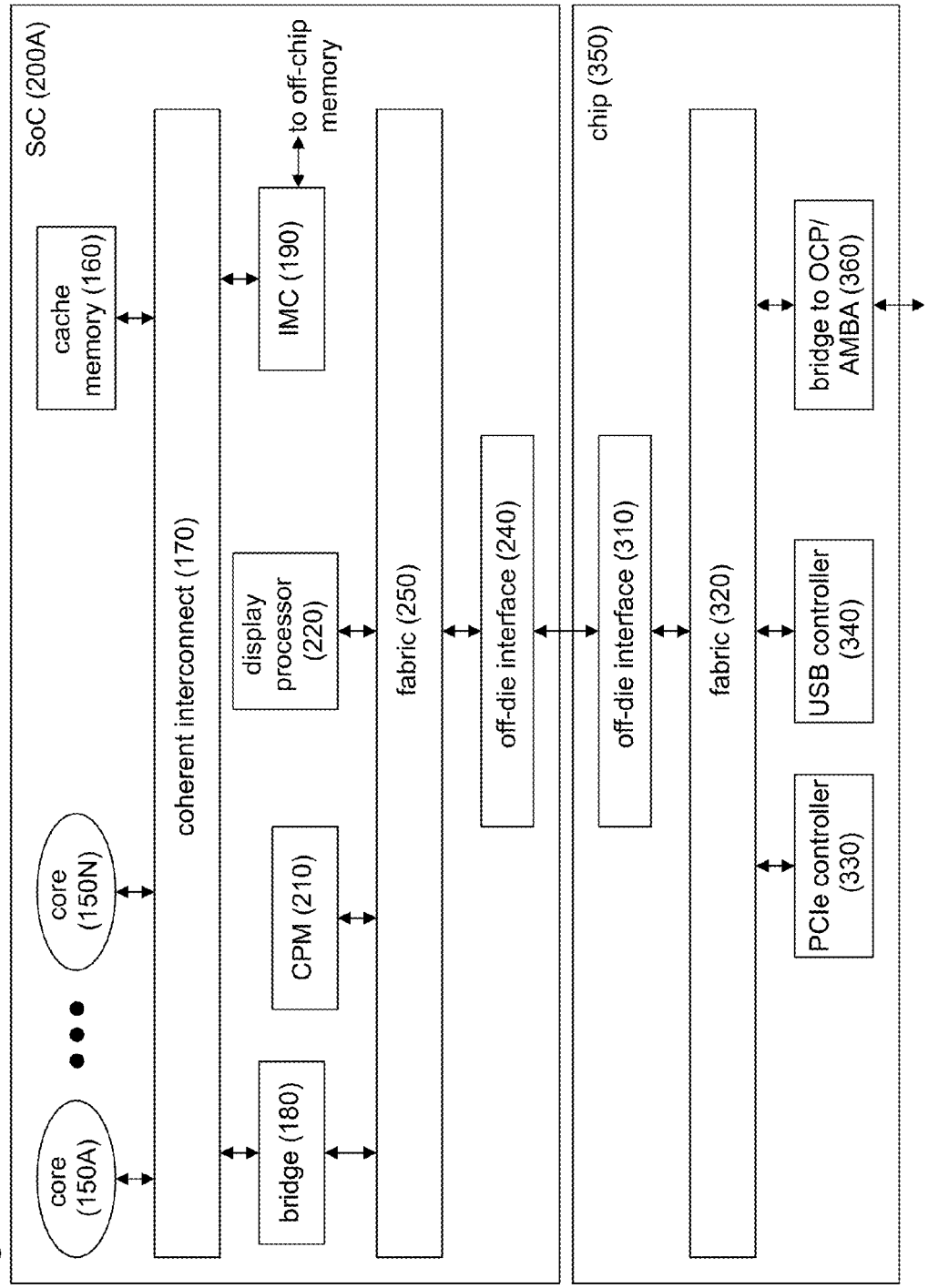
FIG. 4 is a block diagram of a system-on-chip configuration, this time including an off-die interface for connection to other chips, according to some embodiments.

Referring now to FIG. 4, shown is a block diagram of a system, according to some embodiments. As shown in FIG. 4, the system 300 includes a SoC 200A, which includes many components similar to the SoC 200 of FIG. 3. Furthermore, the system 300 includes an additional off-die interface 240, which allows the SoC 200A to communicate with a chip 350. The system 300 and the chip 350 may or may not themselves be system-on-chip implementations. Accordingly, the SoC 200A is able to communicate with the chip 350, which may include various functionality to enable communication between these two chips, as well as to various off-chip devices such as different peripherals according to one or more different specifications.

Specifically, the second chip 350 is shown to include an off-die interface 310 to enable communication with SoC 200A, and which, in turn, communicates with a fabric 320, which may be an IOSF fabric, in some embodiments. As seen, the fabric 320 may further be coupled to various controllers in communication with off-chip devices, including a PCIe™ controller 330, a USB controller 340, and a bridge 360.

Figure 5:
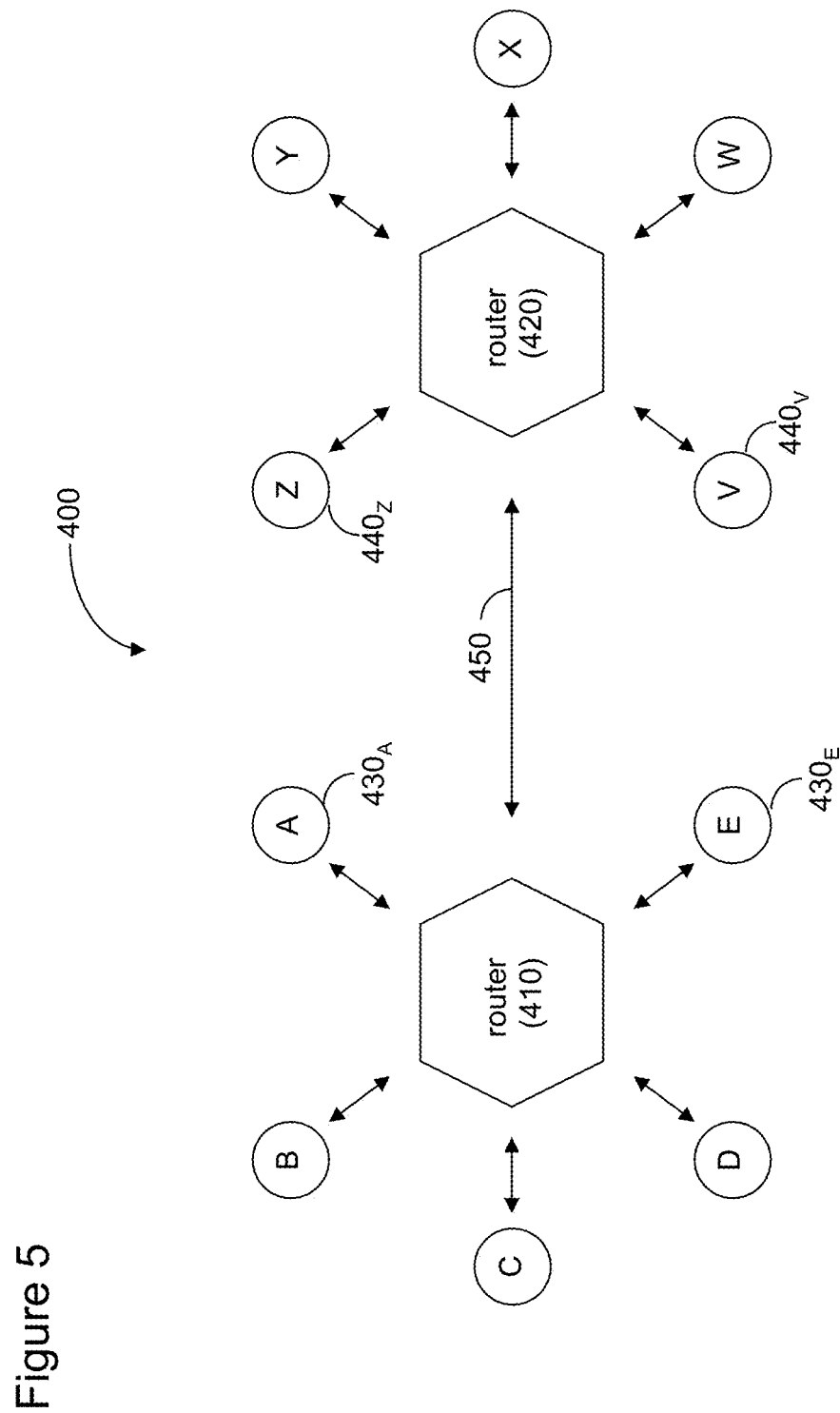
FIG. 5 is a diagram of a sideband interface system, according to some embodiments.

As discussed above, in various embodiments, all out-of-band communications may be via a sideband message interface. FIG. 5 is a block diagram of a sideband interconnection 400, according to some embodiments. The sideband interface system 400 includes multiple routers 410 and 420, which are shown in FIG. 5 as being coupled via a point-to-point (PTP) interconnect 450. In turn, each router can be coupled to various endpoints, which can be, for example, IP agents or other components of a given system. Specifically, router 410 couples to a plurality of endpoints 430A-430E and router 420 couples to a plurality of endpoints 440V-440Z.

Figure 6:
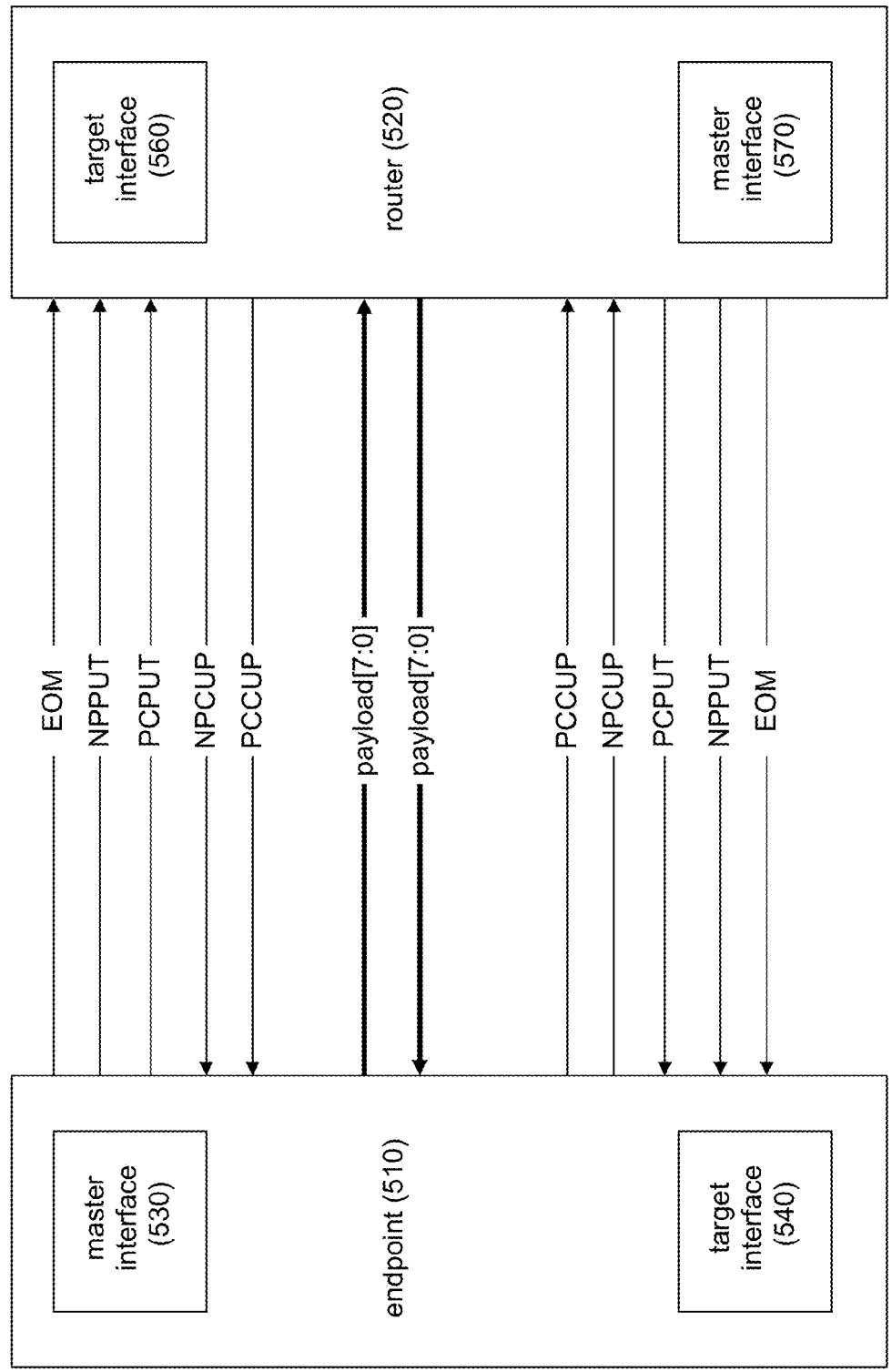
FIG. 6 is a block diagram illustrating sideband interface signaling, according to some embodiments.

FIG. 6 is a block diagram of details of signaling available for a sideband interface 500, according to some embodiments. As shown in FIG. 6, interconnection between a router 520 and an endpoint 510 is shown. Router 520 may include a target interface 560 and a master interface 570. In general, target interface 560 may be configured to receive incoming signals, while master interface 570 may be configured to transmit outgoing signals. As seen, endpoint 510 also includes a master interface 530 and a target interface 540.

FIG. 6 further shows details of the various signaling available for the sideband interface 500, including credit information, put information, end of message signaling, and data. Specifically, credit updates can be communicated via sideband interfaces as a non-posted credit update signal (NPCUP) and a posted credit update signal (PCCUP). In addition, put signals may be provided (NPPUT and PCPUT). In addition, an end of message (EOM) signal can be communicated. Finally, data may be communicated via payload packets, which, in some embodiments, are implemented via a byte-wide communication channel. Although shown with this particular implementation in FIG. 6, the scope of the present invention is not limited in this regard.

Whenever a credit put signal is high, this means that a credit is being returned. Whenever a put signal is high, it means that the payload (e.g., data) signal is valid. Whenever a put and EOM are high at the same time, it means that the current payload is the last payload of the message. Note that the interface can both "put" a data payload and "put" a credit in the same clock cycle.

Figure 7:
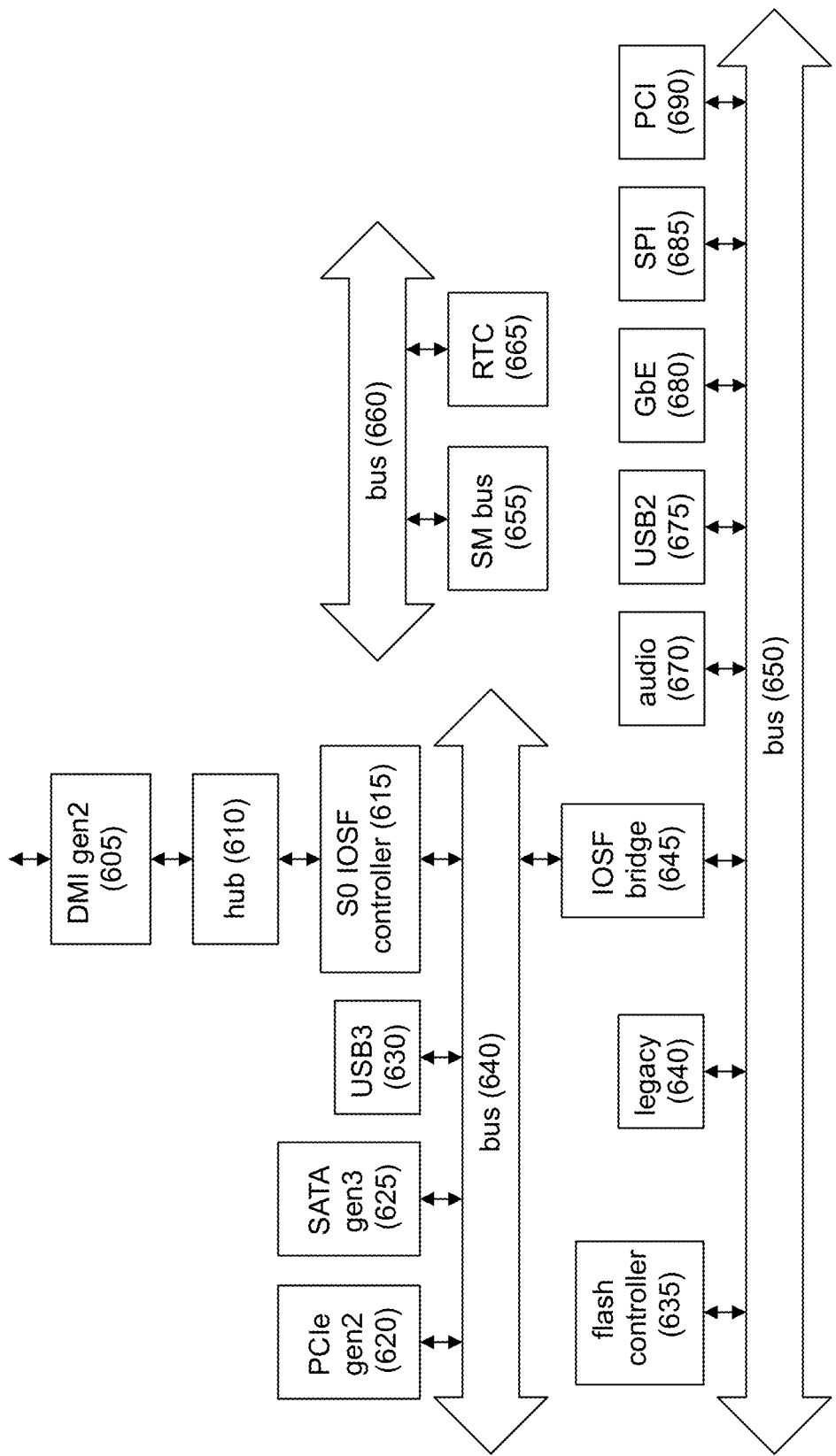
FIG. 7 is a detailed block diagram of a system-on-chip configuration, according to some embodiments.

Although the SoCs of FIGS. 3 and 4 are at a high level, additional functionality may be present. FIG. 7 is a more detailed block diagram of a portion of a SoC in accordance with some embodiments. The portion of the SoC 600 shown may correspond to non-core portions coupled below a memory controller hub or other interface logic that can in turn interface to multiple processor cores, as well as to system memory.

Thus as seen, a direct memory interconnect (DMI) interface 605 may couple to a hub 610, e.g., an input/output hub that in turn provides communication between various peripheral devices. Although not shown for ease of illustration, various engines, such as a manageability engine and a virtualization engine, may be directly coupled to the hub 610.

To provide connection to multiple buses, which may be multi-point or shared buses in accordance with the IOSF specification, an IOSF controller 615 may couple between the hub 610 and a bus 640. In some embodiments, the bus 640 is an IOSF bus that incorporates elements of the fabric as well as routers. The IOSF bus 640 may have coupled to it various controllers to provide for control of off-chip devices. In FIG. 7, a PCI controller 620, a SATA controller 625, and a USB controller 630 are connected to the bus 640. A second IOSF bus 660 may couple to a system management bus 655 and to a real time clock (RTC) 665.

As further seen in FIG. 7, the first IOSF bus 640 may couple to an IOSF bridge 645 for both primary and sideband information that, in turn, provides interconnection to a third bus 650. In some embodiments, the third bus 650 operates according to a different protocol than the bus 640, and various controllers and components operable under the different protocol may be attached thereto. Coupled to the bus 650 is a flash controller 635 to provide an interface to a non-volatile memory, and a legacy device 640, which may implement various legacy functions, e.g., of a PCI specification, and further may include an interrupt controller and timer (not shown). In addition, interfaces for audio 670, USB 675, gigabyte Ethernet (GbE) 680, serial peripheral interface (SPI) 685, and PCI 690 may all be provided. Although shown with this particular implementation in the embodiment of FIG. 7, the scope of the present invention is not limited in this regard.

Figure 8:
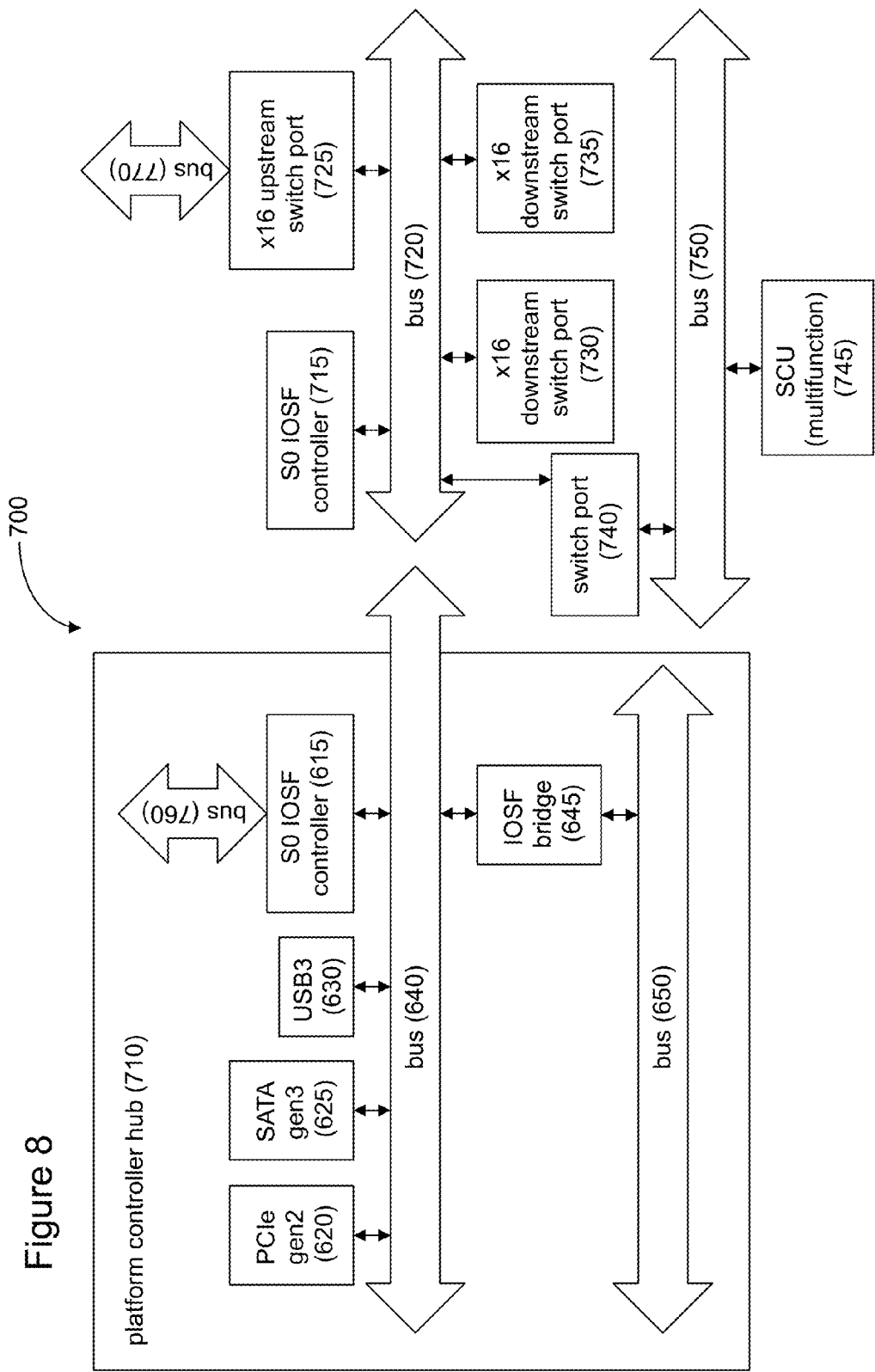
FIG. 8 is a detailed block diagram of a system-on-chip having a platform controller hub, according to some embodiments.

Still other implementations are possible. Referring now to FIG. 8, shown is a block diagram of another SoC in accordance with some embodiments. SoC 700 may be configured for use, such as in server systems. The SoC 700 includes a platform controller hub (PCH) 710, which may generally include components such as seen in the SoC 600 (FIG. 7). Namely, multiple IOSF buses 640 and 650 may be present, along with a bridge 645 to couple the buses. Bus 640 may include various agents coupled to it, including a PCIe controller 620, SATA controller 625, and a USB controller 630. In turn, via an IOSF controller 615, communication may occur via an additional bus 760, which may communicate with upstream devices, such as cores or other processing units (not shown).

As further seen in FIG. 8, for providing communications with other server-based components, an additional IOSF bus 720 may be provided, which in turn can communicate with an IOSF controller 715 and an upstream switch port 725 (e.g., an x16 port) that may be coupled to an upstream bus 770. Also coupled to bus 720 may be multiple downstream switch ports 730 and 735.

Furthermore, to enable communications, e.g., with storage units of a server-based system, a switch port 740 may couple between bus 720 and another IOSF bus 750, which, in turn, may be coupled to a storage controller unit (SCU) 745, which may be a multi-function device for coupling with various storage devices.

System and software debug requires triggering and observation capabilities of the transactions flowing through the fabric of a system. The above SoC implementations are no exception. Since PSF 2.0 adds peer-to-peer support, the PSFs are the ideal location to provide these hooks. As used herein, a peer-to-peer transaction is a transaction flowing from a first agent to a second agent without being received at the central processing unit of the system under test.

Figure 9:
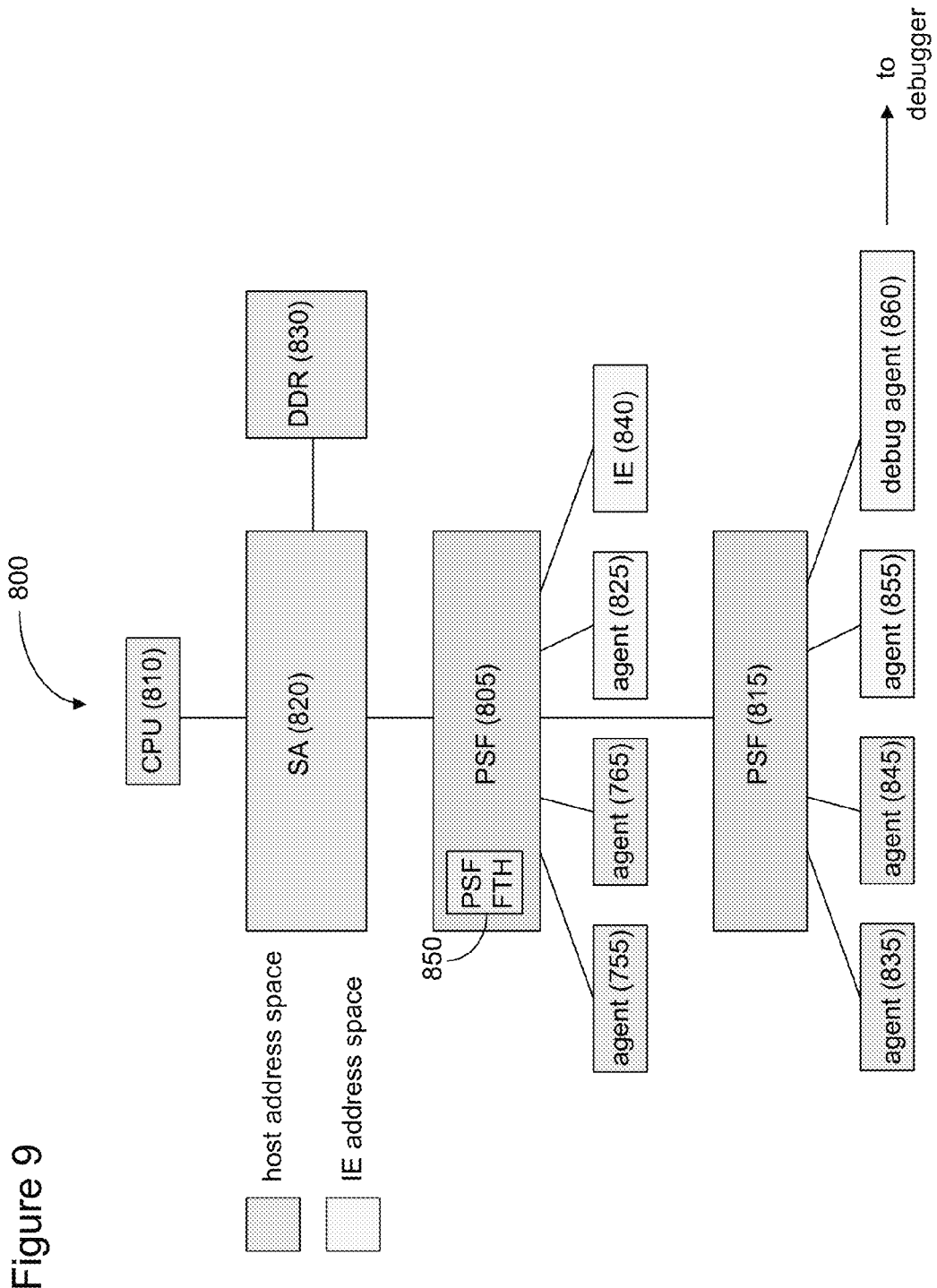
FIG. 9 is a block diagram of a system-on-chip including a fabric trace hook for performing debug operations, according to some embodiments.

FIG. 9 is a simplified block diagram showing a PSF FTH 850 as part of a SoC 800, according to some embodiments. In addition to two instantiations of the system fabric, PSF 805 and PSF 815, the SoC 800 includes a central processing unit (CPU) 810, a system agent (SA) 820, double data rate memory (DDR) 830, agents 755, 765, 825, 835, 845, and 855, an innovation engine (IE) 840, and a debug agent 860. The PSF FTH 850 is disposed within the fabric, specifically, PSF 805, of the SoC 800. A debugger (not shown) connects to the SoC 800 by way of the debug agent 860. In some embodiments, PSF 805 and PSF 815 are IOSF-compliant fabric portions. The PSF FTH 850 is capable of being embedded in the fabric of a SoC, such as the SoC examples of FIGS. 3, 4, 7, and 8, above.

PSF can be used as a single primary IOSF fabric for multiple execution environments or roots. In the system 800, the PSF consists of two instances, PSF 805 and PSF 815, to provide the IOSF fabric for two roots, the host CPU 810 and the IE 840. In this configuration, PSF provides IOSF fabric ports to a set of IOSF agents, 755, 765, 835, and 845 in host address space, and agents 825, 855, the IE 840, and the debug agent 860 in IE address space (with each address space being color-coded accordingly). One IOSF fabric port, PSF 805, provides access to the coherent fabric of the host address space through the system agent (SA) 820, and one port, PSF 815, provides access to the coherent fabric of the innovation engine 840.

In the example of FIG. 9, the PSF fabric trace hook (FTH) 850 is implemented only in PSF 805, based on the planned traffic patterns of the transactions between the agents. Other implementations may include fabric trace hooks in multiple PSFs. Thus, for example, a first PSF FTH may be disposed in PSF 805 while a second PSF FTH may be implemented in PSF 815. In some embodiments, the option to include a PSF fabric trace hook is controlled by a compile-time parameter when instantiating the PSF. This flexibility allows the best usage of silicon area for debug real estate of the particular SoC product. The PSF FTH 850 provides triggering and transaction tracing of IOSF transactions.

PSF 805 and PSF 815 operate as ports to receive one or more agents. In the system 800 of FIG. 9, PSF 805 and PSF 815 are also connected to one another. Arbitration is used to decide which agent has access to its host. Thus, to access the CPU 810, agent 755 is competing with agent 765, agent 825, the IE 840, and PSF 815, with an arbitration scheme resolving competition between these entities. Similarly, to access the host IE 840, agent 845 is competing with agent 835, agent 855, and the debug agent 860.

Recall that, under the latest implementation of the IOSF specification (PSF 2.0), peer-to-peer transactions are possible. This means that agent 755 may communicate with agent 765 without going through the SA 820 (or CPU 810), as one example. By inserting the PSF FTH 850 in the PSF 805 port, transactions between agent 755 and 765 are available for debug, despite the peer-to-peer nature of the transactions.

Figure 10:
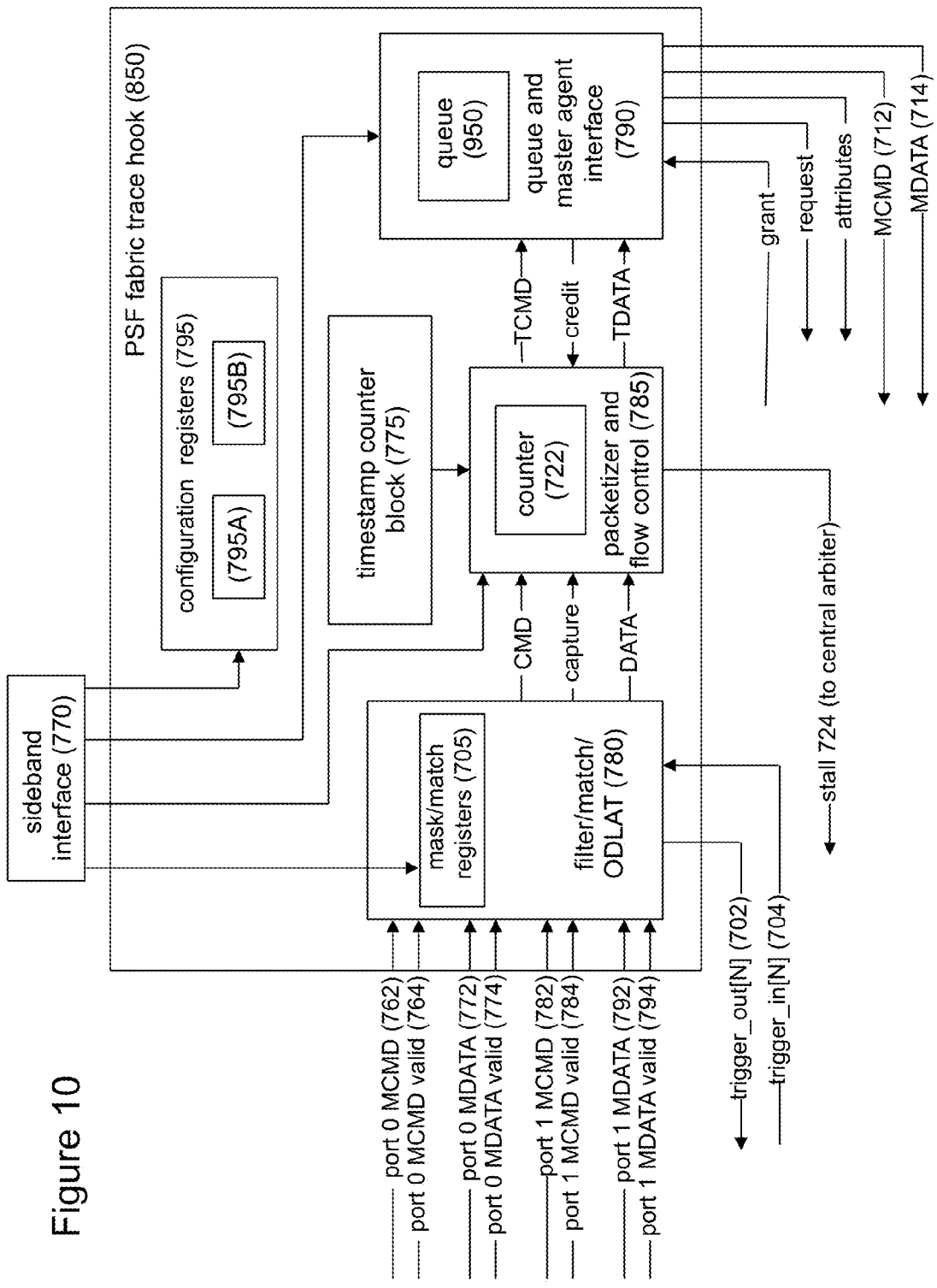
FIG. 10 is a more detailed block diagram of the fabric trace hook of FIG. 9, according to some embodiments.

FIG. 10 is a more detailed block diagram of the PSF fabric trace hook (FTH) 850, according to some embodiments. Recall from the interconnect architecture 100 of FIG. 2 that the fabric 110 includes a primary interface 120, a sideband interface 130, and a DFx interface 140, with each agent on the interconnect being connected to at least one of these interfaces. In the illustration of FIG. 10, the PSF FTH 850 connects to a sideband interface 770 that is part of the SoC 800 (FIG. 9). In some embodiments, the sideband interface 770 operates in accordance with the IOSF specification.

Figure 16:
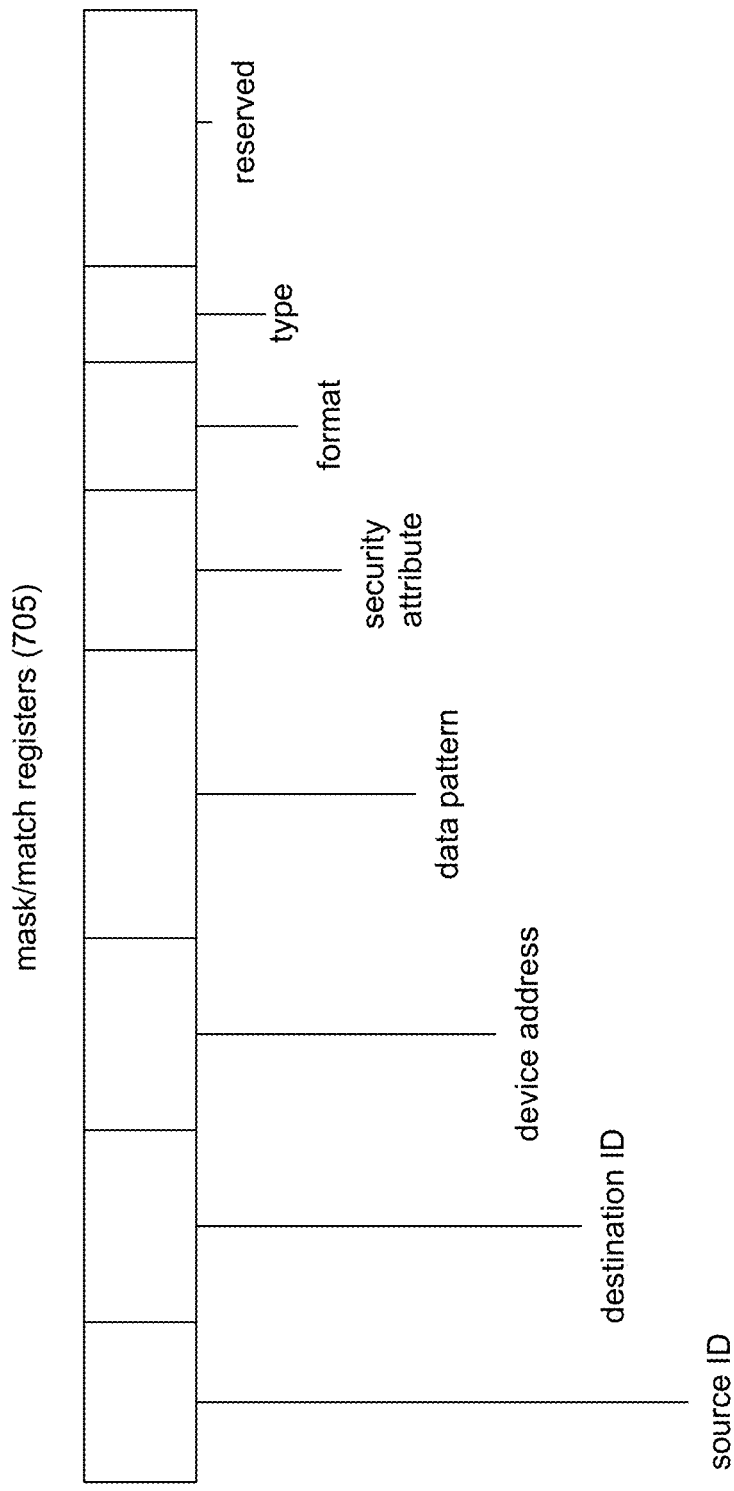
FIG. 16 is a block diagram of one arrangement of the match/mask registers of the PSF FTH of FIG. 9, according to some embodiments.
Figure 17:
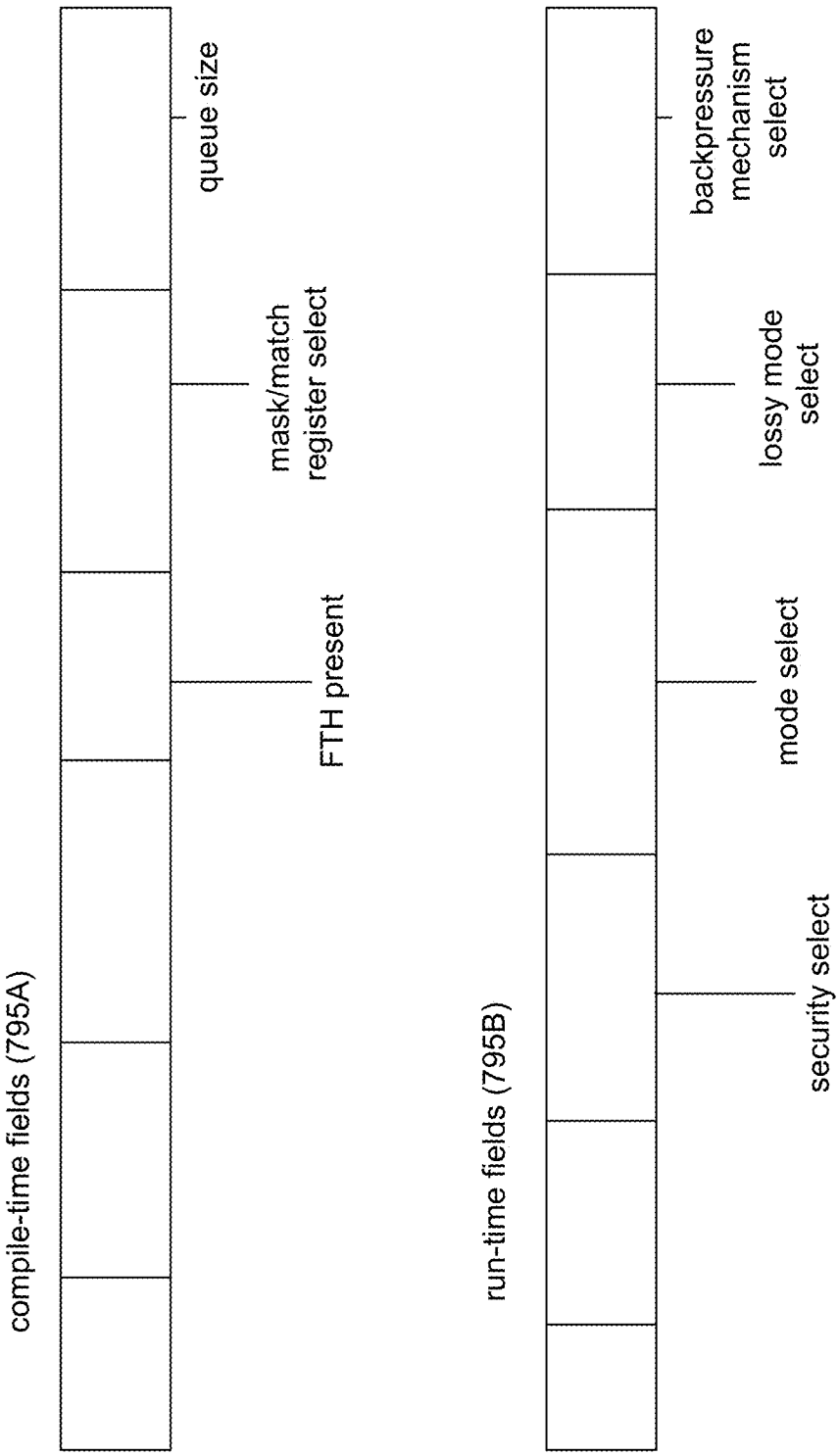
FIG. 17 is a block diagram of one arrangement of the configuration registers of the PSF FTH of FIG. 9, according to some embodiments.

The sideband interface 770 connects to a filter/match on-die logic analyzer trigger (ODLAT) block 780, a packetizer and flow control block 785, and a queue and master agent interface 790. Additionally, configuration registers 795, consisting of both compile-time fields 795A and run-time fields 795B (collectively, configuration registers 795), and mask/match registers 705, are accessible through the sideband interface 770. One possible arrangement of the field configuration of the mask/match register 705 is illustrated in FIG. 16, according to some embodiments. One possible arrangement of the field configuration of the configuration registers 795 is illustrated in FIG. 17, according to some embodiments. A counter 722 is used to keep count during lossy transactions, as described below, with the count being part of the trace packet payload, in some embodiments.

In some embodiments, the run-time portion 795B of the configuration registers 795 enable the PSF FTH 850 to control the available modes of the FTH. The mask/match registers 705 perform filtering of transactions on the fabric, as well as controlling what is to be captured by the PSF FTH 850.

In the IOSF specification, the CMD and DATA fields are separate buses. In some embodiments, the number of mask/match register pairs is a compile-time parameter (found in the compile-time fields 795A of the configuration register 795), such as the one that instantiates a fabric trace hook in the PSF (also found in the compile-time fields 795A), with a minimum of two register pairs being available by default (one for CMD and one for DATA) to support completion tracking. In some embodiments, the mask/match registers 705 and the configuration registers 795 are programmed via the sideband interface 770 in the PSF.

In some embodiments, the available modes of the PSF FTH 850 are: 1) triggering—signal match only; 2) ODLAT completion tracking triggering—signal match only; 3) capture (CMD+a configurable number of dwords of DATA, up to the maximum allowable DATA payload size; and 4) no data capture—CMD only.

In some embodiments, the filter/match/ODLAT block 780 compares the MCMD and MDATA output port buses as input and compares the input values against the mask/match registers 705. Once an incoming command (CMD) or data (DATA) that matches the mask/match registers 705 is received, the filter/match/ODLAT mechanism 780 sends a trigger to the packetizer and flow control mechanism 785. In some embodiments, there are separate triggers, CMD and DATA, for command and data signals, as they are processed separately under the IOSF specification. Similarly, the compile-time portion 795A of the configuration registers 795 may be programmed such that the PSF FTH 850 has separate mask/match registers 705 for CMD and DATA fields.

In FIG. 10, signals from two ports are received by the filter/match/ODLAT block 780, although more ports may be present. Thus, coming from port 0 and port 1, there are four incoming port bus signals, port 0 MCMD 762, port 0 MDATA 772, port 1 MCMD 782, and port 1 MDATA 792, as well as four incoming valid signals, port 0 MCMD valid 764, port 0 MDATA valid 774, port 1 MCMD valid 784, and port 1 MDATA valid 794. The filter/match/ODLAT block 780 invokes a trigger signal (per the mask/match pair) and/or sends a match signal, TCMD or TDATA, to the packetizer and flow control 785.

In some embodiments, the packetizer and flow control block 785 controls capturing of the MCMD 712 and MDATA 714 busses into a queue structure 950 based on enable and mode inputs (from the run-time portion 795B of the configuration registers 795) and match signals (from the match/mask registers 705).

A timestamp counter block 775 ensures that a time stamp is added to the MDATA stored in the queue 950. The timestamp counter block 775 is synchronized to a central timestamp source, such as a global timer of the system under test (e.g., the SoC 800). In some embodiments, the timestamp is a 32-bit timestamp. Thus, the time stamp, the matched command, TCMD, and the matched data, TDATA, are sent to the queue and master agent interface 790 to become the payload that will be sent on the MDATA bus 714 back to the PSF 805, which then sends the payload to the debug agent 860.

In some embodiments, the queue and master agent interface 790 is capable of sending, but not receiving, a transaction. The queue and master agent interface 790 is used to queue the traced transaction, shown as TCMD or TDATA, and send it to the debug agent 860 (FIG. 9). In some embodiments, the depth of the queue 950 is configurable by a build-time parameter, queue size, found in one of the compile-time fields 795A of the configuration registers 795 (FIG. 17) and is sized according to a minimum depth of the traced transaction. Thus, the queue and master agent interface 790 causes the PSF FTH 850 to look like an agent (albeit, a one-way agent) so that the FTH can use the fabric to send captured debug results to the debug agent 860, which is itself connected to a debugger.

In some embodiments, the queue and master agent interface 790 sends a request to a central arbitration block of the PSF 850 and generates the appropriate MCMD to deliver the write. The transaction is a peer-to-peer write over the fabric directed to the debug agent 860. The time stamp, TCMD, and TDATA will be sent as the data payload. If the PSF FTH 850 supports full data capture, the queue 950 is sized to at least the minimum size to transmit a transaction that contains the maximum data payload, plus the entire original MCMD.

With the exception of the initialization of the configuration registers 795 and the programming of the mask/match registers 705, which take place in the sideband interface 770, all transactions with the PSF fabric trace hook 850 are performed using the fabric itself. Thus, the signals coming into the PSF FTH 850, such as the MCMD, MDATA, trigger_in[N] 704 signals, and grant signals, come in through the fabric. Similarly, the outgoing MCMD, MDATA, and trigger_out[N] 702 signals all pass through the fabric.

Figure 11:
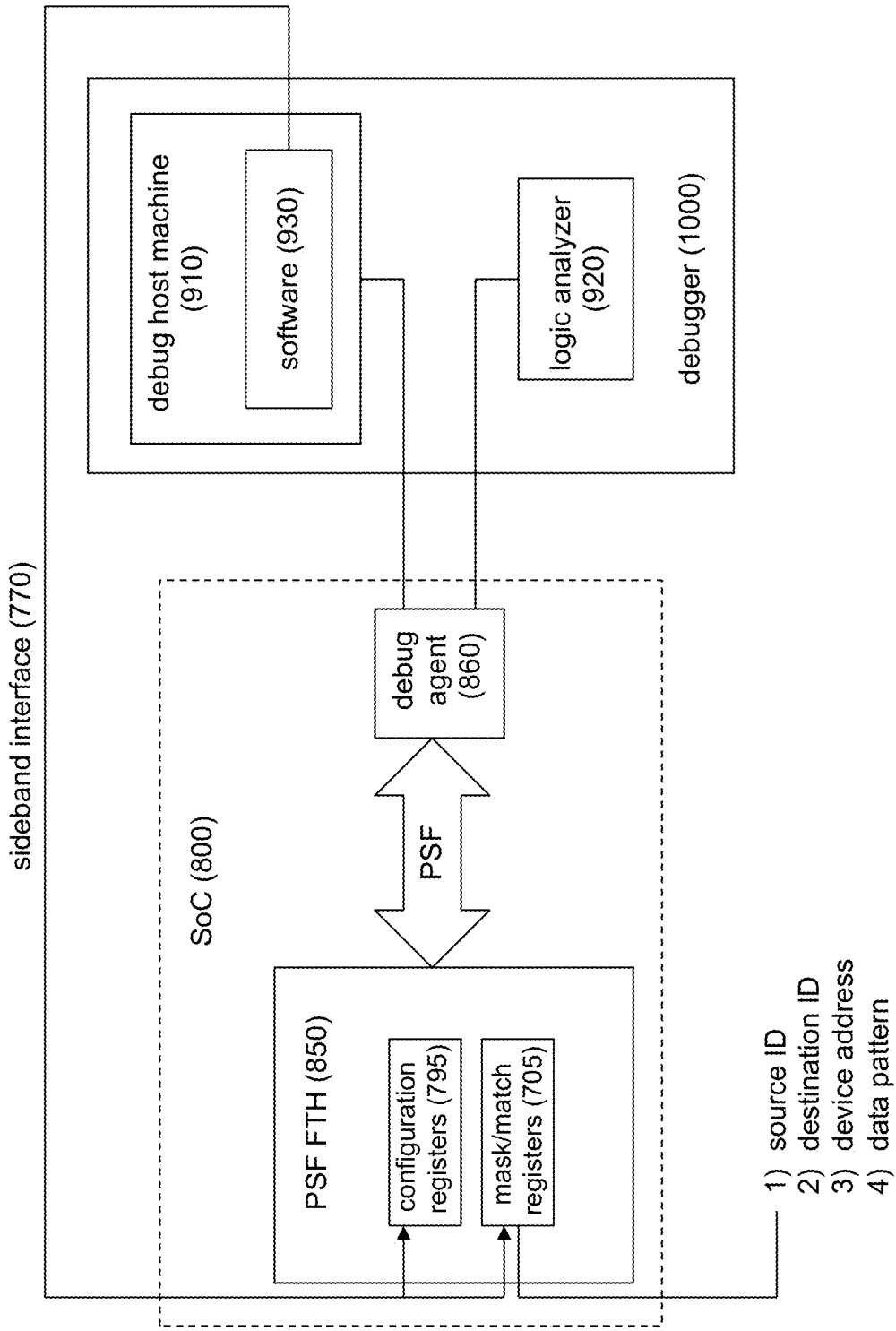
FIG. 11 is a simplified block diagram of the interface between the PSF FTH, the debug agent, and a debugger connected to the SoC of FIG. 9, according to some embodiments.

FIG. 11 is a simplified block diagram showing the connection between the debug agent on the SoC 800 (FIG. 9) and a debugger 1000, used to perform various debugging operations on the SoC. In this example, the debugger 1000 consists of a debug host machine 910 and a logic analyzer 920, although the embodiment is not meant to be limiting in this sense. The debug agent 860 and the PSF FTH 850 are coupled to one another through the PSF fabric, where, as illustrated in FIG. 9, the PSF fabric consists of the PSF 805 and the PSF 815. Captured transactions are sent to the debug agent 860 by the PSF FTH using the fabric, as described above. While part of the PSF FTH 850 (FIG. 10), the configuration 795 and mask/match registers 705 are nevertheless programmed by software 930 on the debug host machine 910, through the sideband interface 770.

In some embodiments, the mask/match registers 705 include, but are not limited to, the following fields: 1) source ID; 2) destination ID; 3) device address; 4) data pattern; 5) security attribute; 6) format; and 7) type. One or more of these fields are used to trigger an action by the debugger 1000.

In some embodiments, the mask/match registers 705 are used by the PSF FTH 850 to trigger on specific individual transactions or classes of transactions. The trigger outputs (shown in FIG. 10 as trigger_out[N] 702 and trigger_in[N] 704) are sent to the debugger 1000, by way of the PSF, and the trigger can be used to generate a pulse on an output pin or generate a trigger action, such as entering a probe mode on the CPU 810 (FIG. 9).

Probe mode is a special processor core debug feature that is controlled via a tap (JTAG). Probe mode is used to halt macro-instruction execution on the processor core in order to be able to set hardware breakpoints and examine processor architectural state and instruction boundaries. Capture mode is the FTH mode of sending the traced transactions to the debug agent. The debug agent can then store the traced transactions to system memory or out to a debug port where a logic analyzer can be used to trace the transactions.

Figure 12:
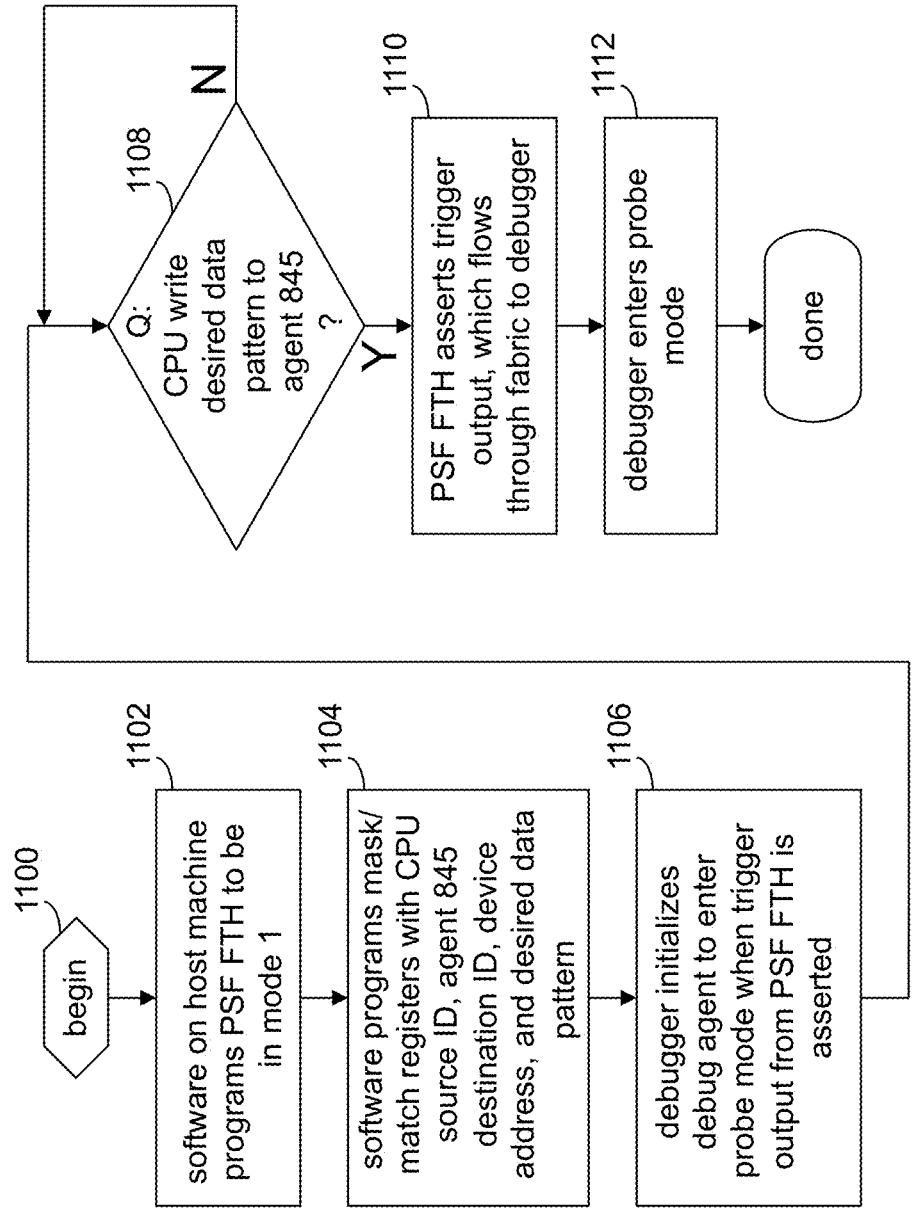
FIG. 12 is a flow diagram showing operations of the PSF FTH of FIG. 9 when the CPU writes to an agent, according to some embodiments.

FIG. 12 illustrates the operations performed by the PSF FTH 850, in some embodiments. In this example, the debugger 1000 is to trigger a probe mode entry when the CPU 810 writes to a specific device in agent 845 with a specific data pattern. Software 930 on the host machine 910 first programs the PSF FTH to be in mode 1, which is "triggering—signal match only" (block 1102). The software 930 also programs the PSF FTH mask/match registers 705 with 1) a source identifier (ID) of the CPU 810; a destination ID of agent 845; 3) the address of the device within the agent; and 4) the data pattern upon which the trigger will occur (block 1104). As explained above, these programming operations takes place through the sideband interface 770. Also, the debugger 1000 initializes the debug agent 860 to enter probe mode when the trigger output from the PSF FTH 850 is asserted (block 1106).

Until the CPU 810 writes the desired data pattern to the device in agent 845, no further action is taken (the "N" prong of block 1108). Once the data pattern is sent, the PSF FTH 850 asserts the trigger output, which flows through the PSF fabric to the debug agent 860 and to the debugger 1000 (block 1110). The debugger 1000 is then able to enter the desired probe mode (block 1112).

In contrast to the above example of a transaction between the CPU and an agent, when an agent generates a read to another agent, the read transaction is marked with a dynamic tag that is assigned by the source agent, known herein as dynamic addressing. When the target agent responds, the completion for the read is sent with this tag value. Because the tag is generated dynamically, static mask/match register values cannot be used. Therefore, in some embodiments, the PSF FTH 850 implements an on-die logic analyzer trigger (ODLAT) mechanism that can be used to track a read completion and generate a subsequent trigger when the read response returns.

Figure 13:
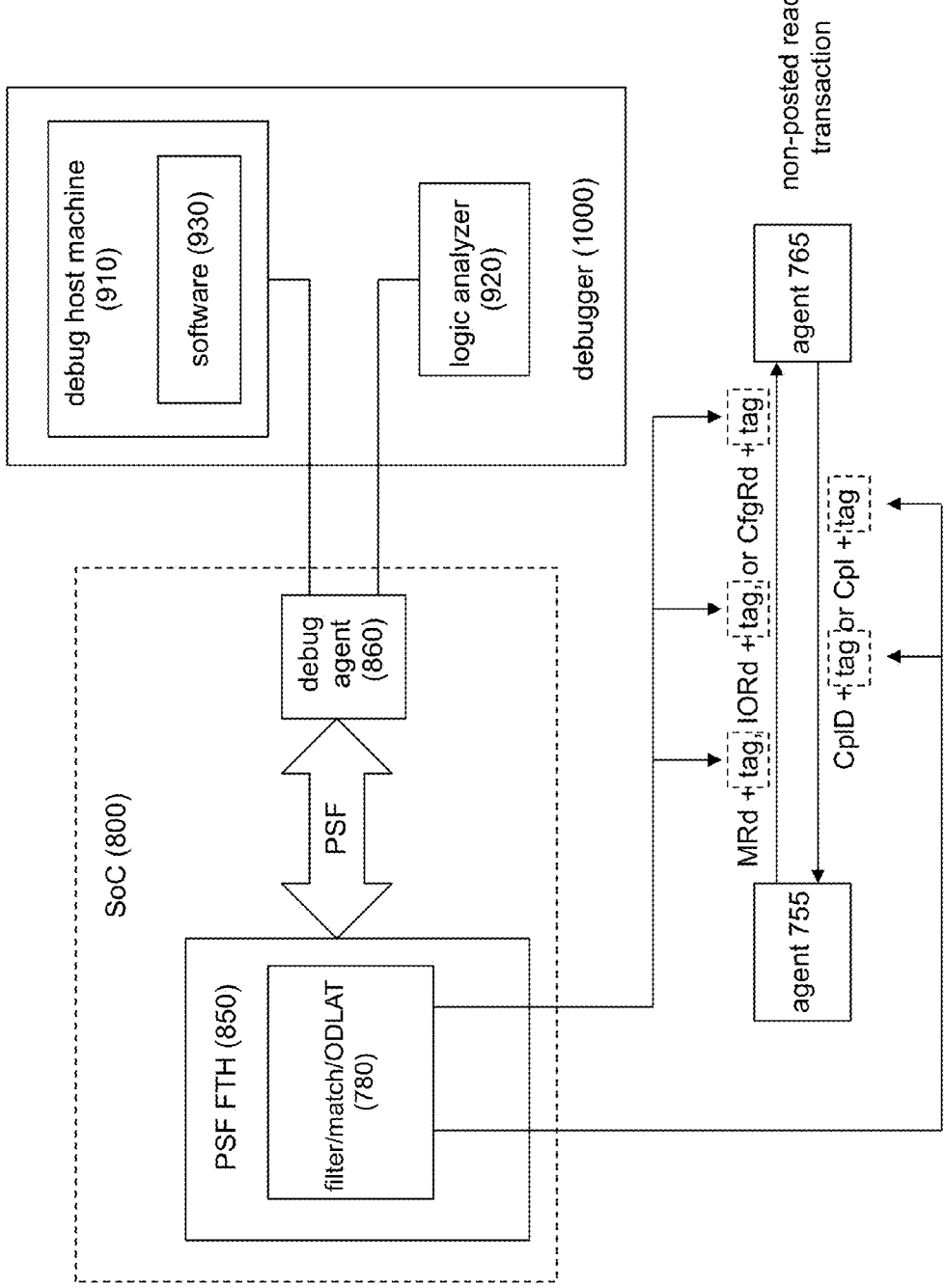
FIG. 13 is a simplified block diagram illustrating how the PSF FTH addresses dynamic tags for capturing operations between agents in the SoC of FIG. 9, according to some embodiments.
Figure 14:
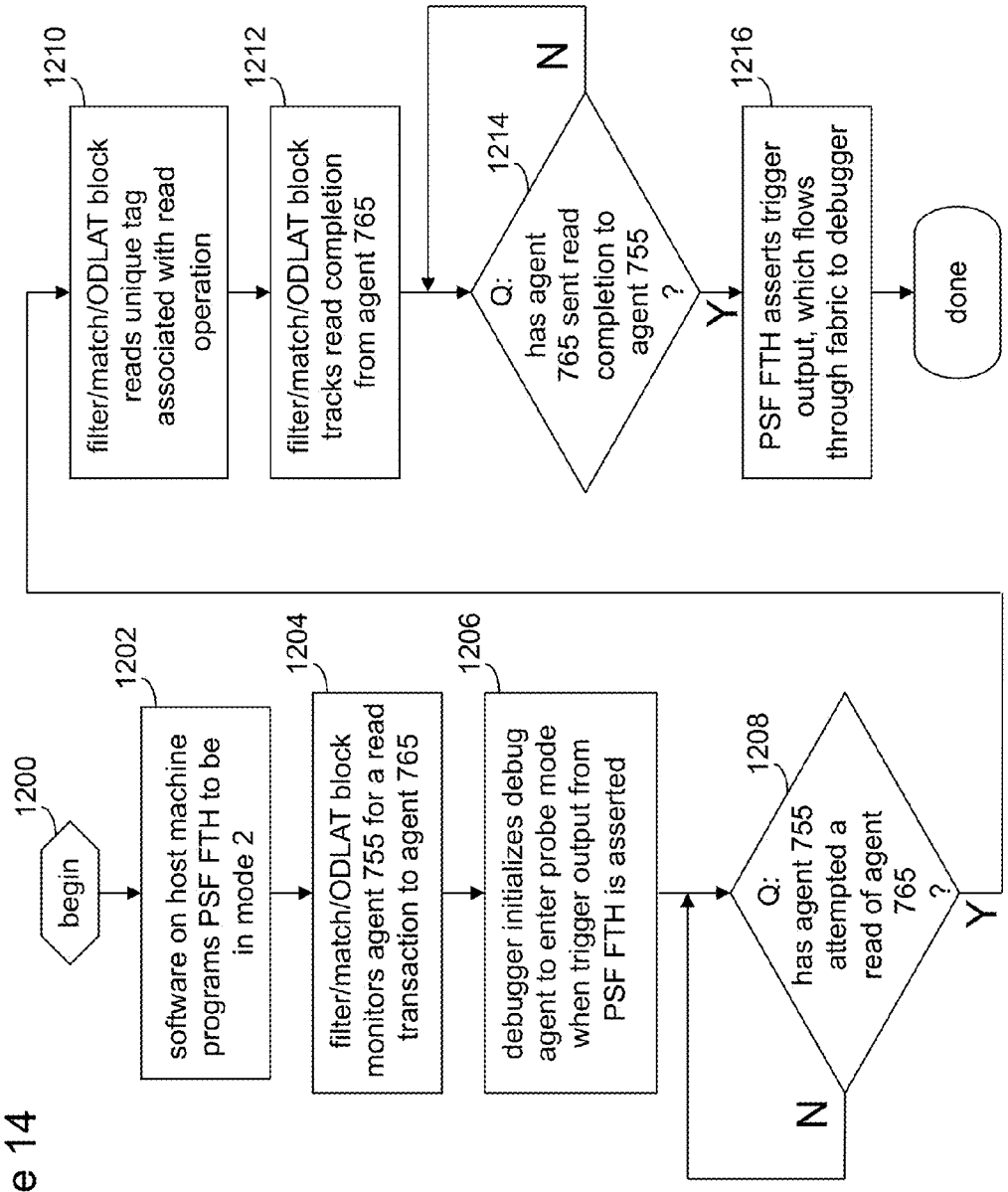
FIG. 14 is a flow diagram showing how the PSF FTH of FIG. 9 addresses dynamic tags, according to some embodiments.

FIG. 13 represents this operation conceptually and FIG. 14 is a flow diagram illustrating the step-wise operations performed by the PSF FTH 850. First, the software 930 on the debug host machine 910 programs the PSF FTH 850 to be in mode 2, which is "ODLAT completion tracking triggering—signal match only" (block 1202). The filter/match/ODLAT block 780 of the PSF FTH 850 monitors transactions between agents 755 and 765, for example. Instead of using the mask/match registers 705, as described above, the PSF FTH 850 monitors agent 755 for a read transaction to agent 765 (block 1204). As in the first mode described in FIG. 12, the debugger 1000 may optionally initialize the debug agent 860 to enter probe mode when the trigger output from the PSF FTH 850 is asserted (block 1206). Alternatively, the debugger 1000 may program the debug agent 860 to enter a capture mode.

Once the read transaction is identified, whether a memory read, an I/O read, or a configuration read (block 1208), the PSF FTH 850 is able to read the unique tag assigned to the transaction (block 1210). The ODLAT mechanism 780 of the PSF FTH 850 is then able to track the read completion from agent 765 (block 1212), whether a successful read completion (CpIID) or a failure (Cpl), by matching the same tag (block 1214), at which time a trigger is generated when the read response returns to agent 755 (block 1216).

Figure 15:
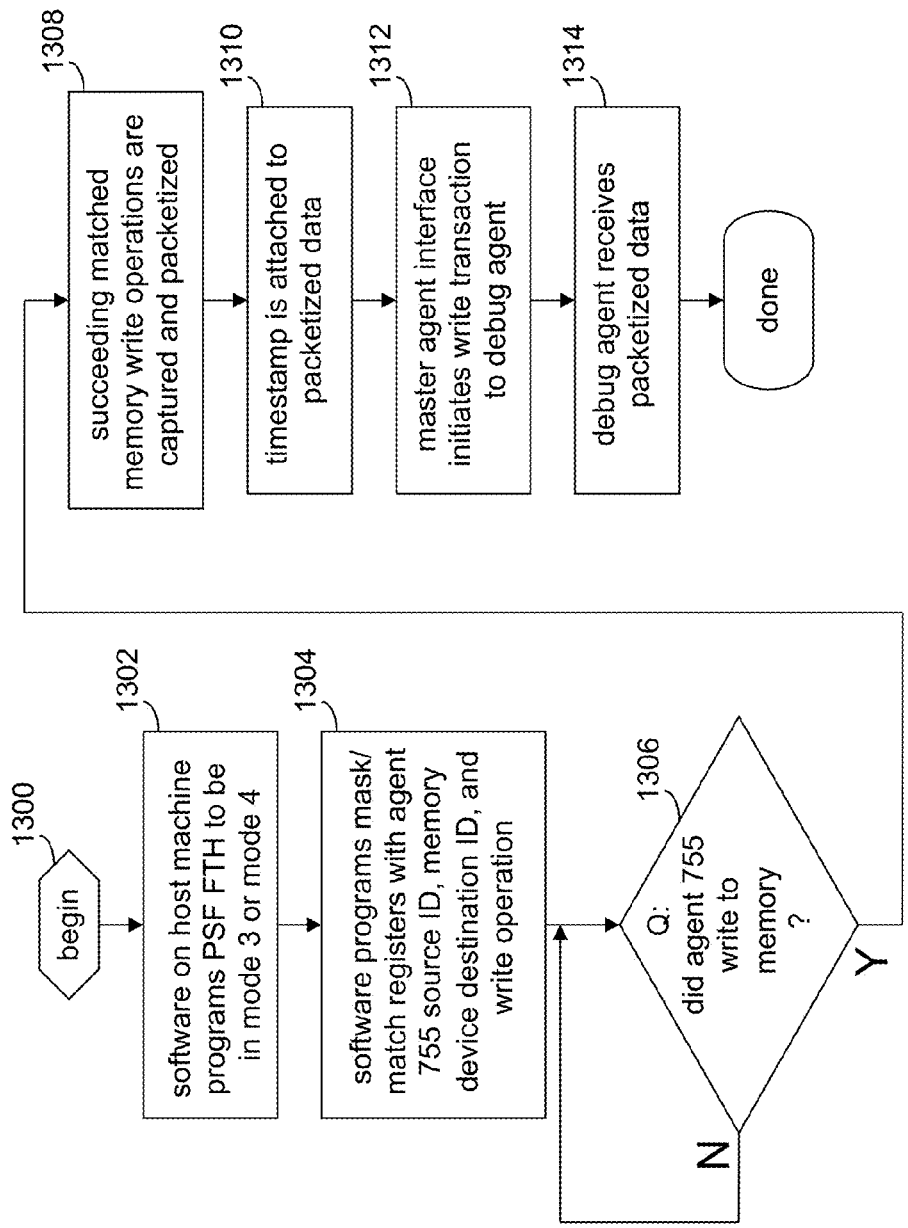
FIG. 15 is a flow diagram showing the capture of operations performed by the PSF FTH of FIG. 9, according to some embodiments.

The PSF FTH 850 also supports programmable triggering on command fields (CMD) and a configurable amount of data (DATA) of all transactions flowing through PSF 805. FIG. 15 is a flow diagram used to illustrate the programmable capturing capability of the PSF FTH 850. In this example, the debugger 1000 wants to observe all memory write operations performed by agent 755. Software 930 on the debug host machine 910 programs the mode select run-time field 795B of the configuration registers 795 (FIG. 17) to put the PSF FTH 850 in mode 3, which is "capture—CMD+a configurable number of dwords" or in mode 4, which is "no data capture—CMD only" (block 1302). The software 930 also programs the mask/match registers 705 to select the debug target (e.g., the source agent, the destination agent, the device address within the destination agent, and the data pattern) (block 1304). Additionally, format and type fields of the mask/match registers 705 would be programmed to specify the type of write operations to match on, in some embodiments. The software 930 can program whether the mask/match registers 705 generate a trigger output, a trace output, or both.

Once a write operation is observed by the PSF FTH 850 (block 1306), succeeding matched write operations by agent 755 are to be sent to the debug agent 860 for analysis by the debugger 1000. First, the traced transaction is packetized by the packetizer and flow control mechanism 785 (block 1308), along with a timestamp generated by the timestamp counter block 775 (block 1310) (FIG. 10). Using the queue and master agent interface 790, the traced transaction is sent as the payload of a new transaction targeted at the debug agent 860 through the fabric (block 1312). This is achieved with the master agent 790 arbitrating with other agents for access to the fabric and so on, just as with a regular transaction. The debug agent 860 receives the packetized results (block 1314) to be analyzed by the debugger 1000. The benefit of using the existing fabric to trace the transactions is that routing channels can be reused and new protocols and buses do not have to be developed.

In some embodiments, the PSF FTH 850 can be configured to trace transactions. The PSF FTH 850 implements logic to capture transactions based on the same mask/match registers 750 used for triggering. The mask/match registers 705 can be used to filter transactions to be traced.

In some embodiments, the PSF FTH 850 includes a security mechanism to disallow the tracing of proprietary transactions. In some embodiments, the SoC 800 accepts both proprietary agents and third-party agents to be part of the SoC. The security mechanism is part of the run-time fields 795B of the configuration registers 795, in some embodiments (FIG. 17). In some embodiments, each agent of the SoC 800 is provided a unique security attribute value, which is sent with every transaction. Using a mask of allowed security attribute values, the PSF FTH 850 is able to allow trigger and trace transactions to only be obtained from certain agents. By including this security mechanism, the proprietary interests of each agent are protected. Further, the third-party provider is able to perform debugging operations on its agent. This protects the IP of each agent manufacturer, in some embodiments.

FIGS. 16 and 17 are diagrams showing a possible implementation of the mask/match registers 705 and configuration registers 795, respectively, according to some embodiments. Any field of the mask/match registers 705 may be used for tracking and capturing operations. The security attribute field contains the unique security attribute field of each proprietary agent that are part of the SoC. The mask/match registers 705 also include format and type fields.

The configuration registers 795 include some fields that are accessed at compile time and others that are accessed at run time. Accordingly, the configuration registers 795 are split into compile-time fields 795A and run-time fields 795B. The compile-time fields 795A include an FTH present field, which is accessed during instantiation of the PSF, a mask/match register select field, for determining the number and type (CMD or DATA) of mask/match registers, and a queue size field, for determining the size of the queue 950 (FIG. 10). The fields of the compile-time portion 795A are not programmable during runtime, in some embodiments.

The run-time fields 795B include a mode select field, to select one of the four operating modes of the PSF FTH 850, a lossy mode select field, for determining whether the capture mechanism of the PSF FTH 850 operates in lossy mode or lossless mode, and a backpressure mechanism select field. The run-time fields are programmable during runtime, in some embodiments. The lossy mode select and backpressure mechanism select fields are described further below.

The PSF FTH 850 also supports either a lossy mode of operation or a lossless mode of operation, in some embodiments. As the name suggests, in the lossy mode, some operations are not processed by the PSF FTH 850, while, in the lossless mode, all operations are processed. This feature gives maximum flexibility to the debugger 1000.

For example, agent 755 requests access to PSF 805. However, the CPU 810 previously sent a request to agent 845, which the PSF FTH 850 is observing. The PSF FTH 850 is also in the process of sending the trace capture transaction to the debug agent 860. In lossless mode, which is selectable by configuring the lossy mode select field of the run-time portion 795B of the configuration registers 795, the PSF FTH 850 must complete its trace capture transaction to the debug agent 860 before agent 755 can access PSF 805.

Returning to FIG. 10, in the lossless mode, when the queue 950 is full or nearly full (according to a predefined high threshold value), the stall signal 724 is asserted to a central arbiter of the PSF 805 (not shown). This causes the queue 950 to drain either completely or to a nearly empty state (according to a predefined low threshold value). The stall signal 724 thus blocks the central arbitration logic in the PSF 805 from granting any further new transactions from being transmitted from any of the agents toward the PSF. In this manner, the PSF FTH 850 does not miss capturing any new transactions while transmitting previously matched transactions in lossless mode, in some embodiments.

In lossy mode, by contrast, the PSF FTH 850 minimizes any perturbance to the normal flow of traffic, in some embodiments. So, if agent 755 makes a request while the debug agent 860 is tracing transactions for agent 845, the agent 755 transaction will be lost because the PSF FTH 850 is able to send one transaction at a time. Therefore, in some embodiments, while in the lossy mode, the counter 722 (FIG. 10) keeps track of how many transactions have been dropped, with the loss threshold count being a programmable value. The count is sent along with the trace packet payload.

In some embodiments, the PSF FTH 850 has a mechanism to backpressure transactions generated by agents connected to the PSF. Selectable by programming the backpressure mechanism select field of the run-time portion 795B of the configuration registers 795, this field is used to create a lossless mode of operations when the PSF FTH 850 is configured to trace transactions. A stall signal 724 (FIG. 10) connected to the central arbiter (not shown) is used to backpressure the transactions. The lossless mode requires more fabric and debug agent bandwidth than the lossy mode, because lossless mode occurs without substantial filtering.

The backpressure mechanism can be turned off to minimize normal functional traffic intrusion. In this "lossy" mode of operation, a dropped packet count is sent with the traced transaction to indicate how many packets were dropped since the last successfully captured transaction. These two modes allow the debugger 1000 to choose between full transactions tracing versus reducing impact to system functionality.

Embodiments can be used in many different types of systems. As examples, implementations described herein may be used in connection with semiconductor devices such as processors or other semiconductor devices that can be fabricated on a single semiconductor die. In particular implementations, the device may be a SoC or other advanced processor that includes various homogeneous and/or heterogeneous processing agents, and additional components such as networking components, e.g., routers, controllers, bridge devices, memories, and so forth.

Although embodiments are described herein in connection with this IOSF specification, the scope of the disclosure is not limited in this regard and embodiments can be used in many different types of systems.

While the application has been described with respect to a limited number of embodiments, those skilled in the art will appreciate numerous modifications and variations therefrom. It is intended that the appended claims cover all such modifications and variations as fall within the true spirit and scope of the invention.

We claim:

1. An apparatus comprising:
   a host processing unit comprising a central processing unit (CPU);
   a fabric coupled to the CPU, a first agent, a second agent, and a debug agent, the debug agent to be coupled to an external debugger, wherein the first agent is to provide transactions to the second agent without accessing the host processing unit;
   a fabric trace hook disposed within the fabric, the fabric trace hook, in response to detecting a transaction provided from the first agent to the second agent without accessing the CPU, to:
      set a trigger, wherein the trigger is to be received by the debug agent; and
      capture one or more succeeding transactions flowing from the first agent to the second agent in response to not setting the trigger, wherein the succeeding transactions are to be sent to the debug agent;
   a mask/match register to be programmed by a software program executed from within the external debugger, the mask/match register to be accessed by a sideband interface between the debugger and the fabric trace hook, wherein the mask/match register determines the transaction to be monitored;
   a queue to receive the one or more captured succeeding transactions; and
   a run-time configuration register programmable by the software program via the sideband interface during run-time operation, the run-time configuration register, when initialized, to program the fabric trace hook in one of the following modes:
      triggering—signal match only;
      on-die logic analyzer trigger completion tracking triggering—signal match only;
      capture, command plus a configurable number of doublewords of data; and
      no data capture—command only.

2. The apparatus of claim 1, wherein the fabric is a primary scalable fabric.

3. The apparatus of claim 2, wherein the primary scalable fabric is operable according to an integrated on-chip system fabric specification.

4. The apparatus of claim 1, further comprising:
   a compile-time configuration register programmable by the software program via the sideband interface during compile-time operation, the compile-time configuration register, when programmed, to:
   control whether the fabric trace hook is present in an instantiated primary scalable fabric;
   wherein the compile-time configuration register is not available during run-time operation.

5. The apparatus of claim 4, the compile-time configuration register further comprising:
   a field to establish a predefined number of mask/match registers available to the fabric trace hook;
   wherein the predefined number is programmed at instantiation of the fabric trace hook.

6. The apparatus of claim 5, the compile-time configuration register further comprising:
   a field to establish a predefined queue size available to the fabric trace hook;
   wherein the predefined queue size is programmed at instantiation of the fabric trace hook.

7. The apparatus of claim 1, wherein the mask/match register further comprises:

a source agent identifier field;
a destination agent identifier field;
an address of a device in the destination agent field;
a data pattern field;
a security attribute field, wherein each agent comprises a unique security attribute;
a type field; and
a format field
wherein the fabric trace hook captures the transaction flowing from the first agent to the second agent based on values programmed into one or more of the fields by the software program.

8. The apparatus of claim 1, wherein the mask/match register comprises the following fields:
a source agent identifier;
a destination agent identifier;
a device address within the destination agent;
a data pattern; and
a security attribute of the destination agent;
wherein each agent in the fabric comprises a unique security attribute.

9. The apparatus of claim 1, wherein the configuration register comprises the following fields:
a backpressure mechanism select field;
a security select field;
a mode select field; and
a lossy mode select field.

10. The apparatus of claim 1, wherein the trigger is coupled to an output pin of a DFx fabric.

11. The apparatus of claim 1, wherein the monitored transaction is a command operation.

12. The apparatus of claim 1, wherein the monitored transaction is a data operation.

13. The apparatus of claim 1, further comprising:
a stall signal to be asserted to a central arbitration unit in response to the queue being filled higher than a predefined high threshold value as a result of the fabric trace hook being in a lossless mode;
wherein the queue drains to a state not below a predefined low threshold value before any new transactions are transmitted to the fabric.

14. The apparatus of claim 1, the fabric trace hook further comprising:
an on-die logic analyzer trigger to capture the transaction flowing from the first agent to the second agent, wherein transactions between the first agent and the second agent use dynamic addressing, the on-die logic analyzer to:
monitor the transaction flowing from the first agent to the second agent, wherein the transaction is coupled with a tag;
track a completion transaction comprising the tag from the second agent to the first agent; and
generate a trigger when the completion transaction ends, wherein the trigger is received, through the fabric, by the debug agent.

15. The apparatus of claim 14, further comprising:
a timestamp counter block to generate a timestamp to be coupled with captured transactions, wherein the timestamp is synchronized to a central timestamp source.

16. The apparatus of claim 15, the fabric trace hook further comprising an interface to:
receive the captured succeeding transactions, the captured succeeding transactions further comprising kept transactions and dropped transactions.

17. The apparatus of claim 16, the interface to further:
couple the captured succeeding transactions with the timestamp to produce a result;
packetize the result to produce a trace packet payload; and
transmit the trace packet payload to the debug agent over the fabric.

18. The apparatus of claim 16, the interface to further:
couple the kept transactions with the timestamp to produce a result;
packetize the result to produce a trace packet payload; and
transmit the trace packet payload to the debug agent over the fabric.

19. The apparatus of claim 18, further comprising:
a counter to count the dropped transactions and generate a count result;
wherein the count result is packetized along with the result and transmitted to the debug agent as part of the a trace packet payload.

20. A method comprising:
programming, by a software program operating in a debugger coupled externally to a processor-based system, a configuration register, the configuration register, as programmed, to:
indicate that a fabric trace hook (FTH) is available in a primary scalable fabric (PSF) of the processor-based system, the FTH being embedded in the PSF, the PSF to couple a system agent, a first agent, a second agent, and a debug agent, the debug agent to couple to the debugger;
define one or more mask/match registers available to the FTH, the one or more mask/match registers to provide an identifier (ID) for the first agent, an ID for the second agent, and an address of the second agent; and
establish a queue of a predetermined size available to the FTH;
wherein the programming of the configuration register takes place on a sideband interface during a compile-time operation of the processor-based system;
programming, by the software program, the configuration register to put the PSF FTH to be in a first mode of four available modes, wherein the first mode enables the FTH to capture a configurable number of double words of data following a write operation from the first agent to the second agent, the first mode programming to take place during runtime operation of the processor-based system;
monitoring, by the FTH of the processor-based system under test, the write operation of the first agent, the write operation to flow between the first agent and the second agent without involving the system agent, wherein the FTH:
captures the configurable number of double words of data from the first agent to the second agent once the write operation has occurred; and
sends the configurable number of double words of data to the external debugger by way of the PSF.

21. The method of claim 20, further comprising:
packetizing the configurable number of doublewords of data resulting in packetized data; and
attaching a timestamp to the packetized data, resulting in timestamped packetized data;
wherein the timestamped packetized data is sent to the debug agent.

22. The method of claim 21, wherein the second agent is a memory of the processor-based system.

23. An article comprising a machine-accessible non-transitory storage medium including instructions that when executed enable a system-on-chip (SoC) to:
program a mask/match register with a source identifier of a central processing unit (CPU) operating in the SoC, a destination agent identifier, and an address of the destination agent, and a desired data pattern;

program a fabric trace hook (FTH) of a primary scalable fabric (PSF) to be in a mode for triggering, wherein the FTH is embedded in the PSF and the PSF couples the CPU, the destination agent, and a debug agent;

wherein the PSF FTH asserts a trigger output in response to the CPU writing the desired data pattern to the destination agent and the trigger output flows through the PSF to a debugger coupled to the debug agent, causing the debugger to enter a probe mode.

24. The article of claim 23, further including instructions that when executed enable the SoC to:

initializes the debug agent to enter probe mode in response to the trigger output from the PSF FTH.

25. An article comprising a machine-accessible non-transitory storage medium including instructions that when executed enable a system-on-chip (SoC) to:

program a fabric trace hook (FTH) of a primary scalable fabric (PSF) of the SoC to trigger on a read operation, wherein the FTH is embedded in the PSF and the PSF couples a first agent, a second agent, and a debug agent;

monitor, using the FTH embedded in the PSF of the SoC, a plurality of transactions between the first agent and the second agent in the SOC, the FTH to be programmed to operate in one of four possible modes, the FTH to receive identifiers of the first agent and the second agent from a register, wherein the plurality of transactions do not go through a central processing unit of the SoC;

initialize the debug agent to enter a probe mode once the trigger is received from the FTH;

identify, using the fabric trace hook, a read transaction among the plurality of transactions, wherein the read transaction is flowing from the first agent to the second agent;

identify, using the fabric trace hook, a read completion transaction from the second agent; and send, using the fabric trace hook, the trigger output to the debug agent, by way of the PSF.

26. The article of claim 25, further including instructions that when executed enable the SoC to:

identify, using the FTH, a dynamic tag associated with the read transaction, wherein the dynamic tag is assigned to the read transaction by the first agent;

monitor, using the FTH, the read completion transaction flowing from the second agent to the first agent, the read completion transaction comprising a completion operation of the read transaction, wherein the second operation is coupled with the dynamic tag; and send, using the FTH, the trigger output to the debug agent once the dynamic tag is identified in the read completion transaction.

27. The article of claim 26, further including instructions that when executed enable the SoC to:

monitor, by the FTH, the read completion transaction using an on-die logic analyzer trigger mechanism.

28. A method comprising:

monitoring, by a fabric trace hook of a system comprising a central processing unit, a transaction by an agent to a memory device, the agent, the memory device, and the transaction to be known to the fabric trace hook by accessing a mask/match register programmed by a debugger external to the system, the debugger to further program a configuration register via a sideband interface such that the fabric trace hook is in one of four possible modes, wherein the agent, the memory device, and a debug agent are coupled together by a fabric and the fabric trace hook is embedded in the fabric;

capturing, by the fabric trace hook, a plurality of succeeding matched operations from the agent to the memory;

packetizing, by the fabric trace hook, the succeeding matched operations, resulting in a packet payload; and sending, by the fabric trace hook, the packet payload to the debug agent, by way of the fabric.

29. The method of claim 28, further comprising:

coupling, by the fabric trace hook, the packet payload to a timestamp before sending the packet payload to the debug agent, the timestamp to be generated by a timestamp counter synchronized to a central timestamp source of the system.

\* \* \* \* \*